United States Patent [19]

Nojima et al.

[11] Patent Number: 5,068,820

[45] Date of Patent: Nov. 26, 1991

[54] DATA TRANSFER SYSTEM HAVING TRANSFER DISCRIMINATION CIRCUIT

[75] Inventors: Satoshi Nojima; Kazuo Sakagawa, both of Kawasaki; Hideo Suzuki, Yokohama, all of Japan

[73] Assignee: Fujitsu Limited, Kawasaki, Japan

[21] Appl. No.: 221,908

[22] PCT Filed: Oct. 16, 1987

[86] PCT No.: PCT/JP87/00787

§ 371 Date: Jun. 10, 1988

§ 102(e) Date: Jun. 10, 1988

[87] PCT Pub. No.: WO88/02888

PCT Pub. Date: Apr. 21, 1988

[30] Foreign Application Priority Data

Oct. 17, 1986 [JP] Japan .................................. 61-248007
Oct. 24, 1986 [JP] Japan .................................. 61-252883
May 2, 1987 [JP] Japan .................................. 62-107949

[51] Int. Cl.$^5$ .......................................... G06F 13/42
[52] U.S. Cl. ............................ 395/275; 364/935.48; 364/940.81; 364/950.1; 364/950.3; 364/DIG. 2
[58] Field of Search ... 364/200 MS File, 900 MS File

[56] References Cited

U.S. PATENT DOCUMENTS

| | | | |
|---|---|---|---|
| 3,582,906 | 6/1971 | Beausoleil et al. | 364/200 |
| 3,668,650 | 6/1972 | Wang | 364/200 |
| 3,970,997 | 7/1976 | Daly et al. | 364/200 |
| 4,514,823 | 4/1985 | Mendelson et al. | 364/900 |
| 4,534,011 | 8/1985 | Andrews et al. | 364/900 |
| 4,615,017 | 9/1986 | Finlay et al. | 364/900 |
| 4,660,169 | 4/1987 | Norgren et al. | 364/900 |
| 4,712,176 | 12/1987 | Fredericks et al. | 364/200 |

OTHER PUBLICATIONS

Patent Abstracts of Japan, vol. 9, No. 257 (P-396) (1980), Oct. 15, 1985.
Patent Abstracts of Japan, vol. 9, No. 257 (P-396) (1980), Oct. 15, 1985.
IBM Technical Disclosure Bulletin, vol. 24, No. 5, Oct. 1981, pp. 2621-2622 by S. R. Firth et al.
IBM Technical Disclosure Bulletin, vol. 19, No. 8–Jan. 1977, pp. 3139-3143 by K. R. Lynch et al.
Patent Abstracts of Japan, vol. 9, No. 257 (P-396) (1980), Oct. 15, 1985.
European Patent Application, No. 0191334 (IBM-)–Aug. 20, 1986.

*Primary Examiner*—Gareth D. Shaw
*Assistant Examiner*—Paul Kulik
*Attorney, Agent, or Firm*—Staas & Halsey

[57] ABSTRACT

A data transfer system having a transfer discrimination circuit for discriminating the type of data transfer between an input/output channel device and I/O devices for a computer includes a transfer discrimination circuit. This circuit includes a edge detection unit operating in response to a tag signal supplied to the edge detection unit for detecting the trailing edge of the tag signal after a leading edge of the tag signal has passed. The edge detection unit having a leading edge detector, a trailing edge detector, a storage element, and logic gate circuits. A timing unit is included operating in response to the output of the edge detection unit for counting a predetermined time, along with a discrimination storage unit operating in response to the output of the timing unit for delivering an output indicating an interlock data transfer or an output indicating a data streaming feature data transfer.

14 Claims, 21 Drawing Sheets

Fig. 2 INTERLOCK DATA TRANSFER

Fig. 3 DATA STREAMING FEATURE (DSF) TRANSFER

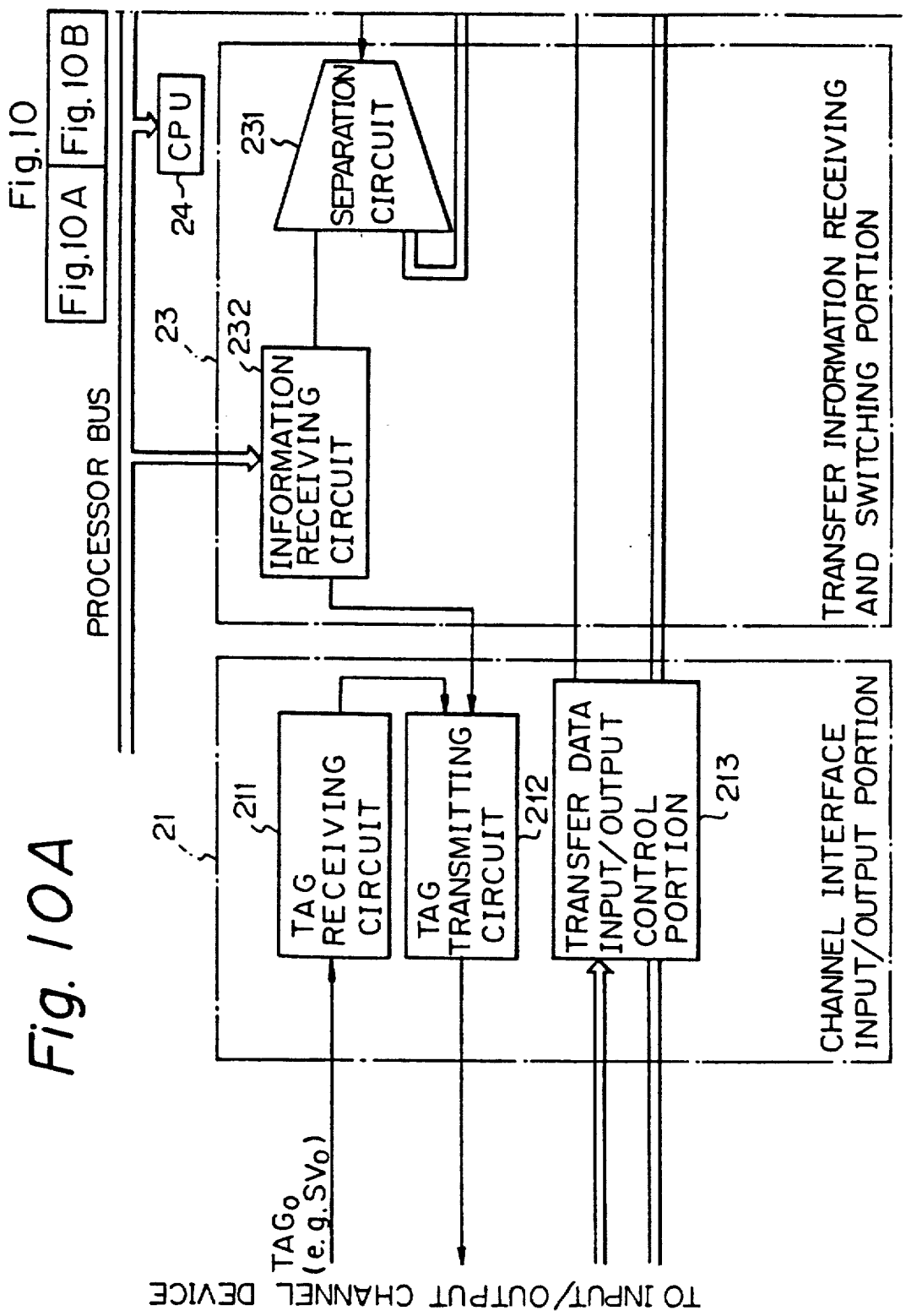

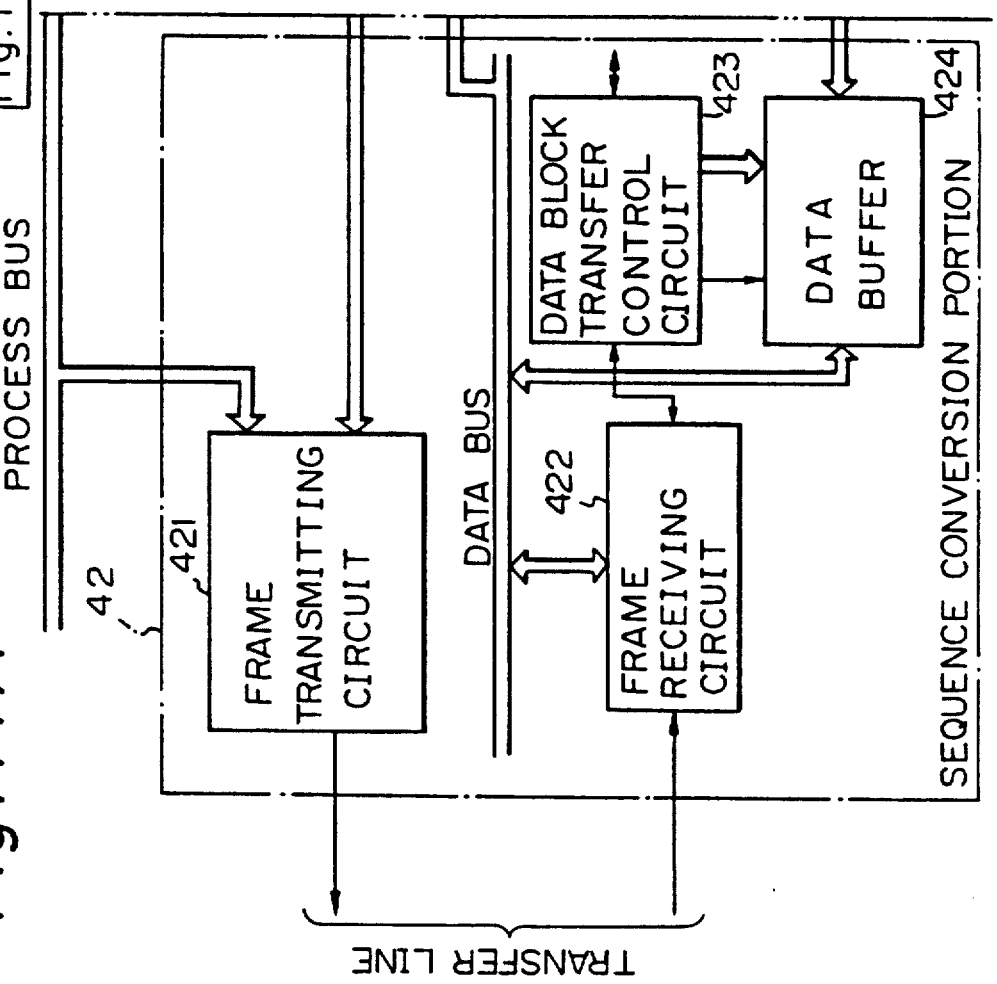

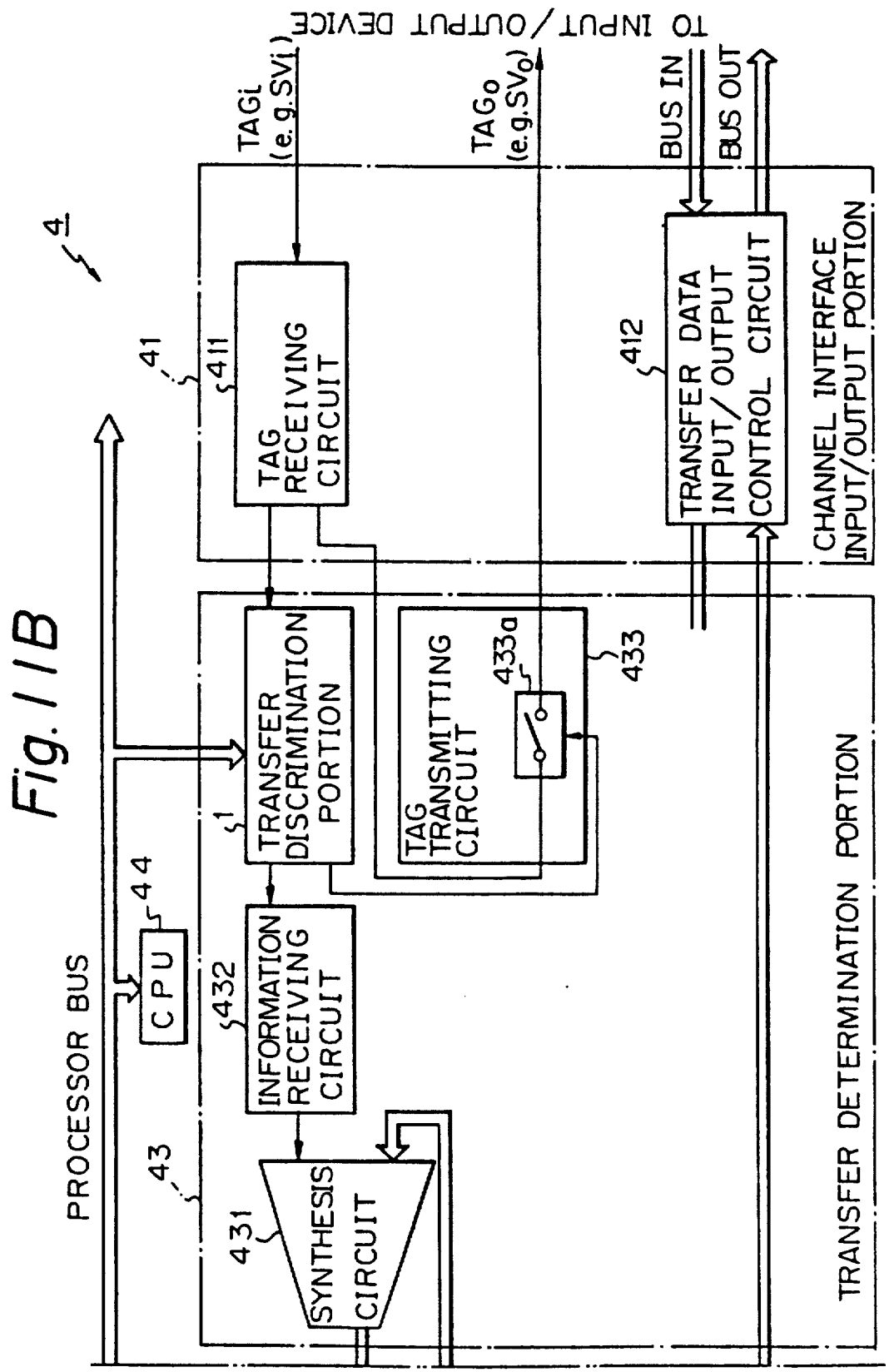

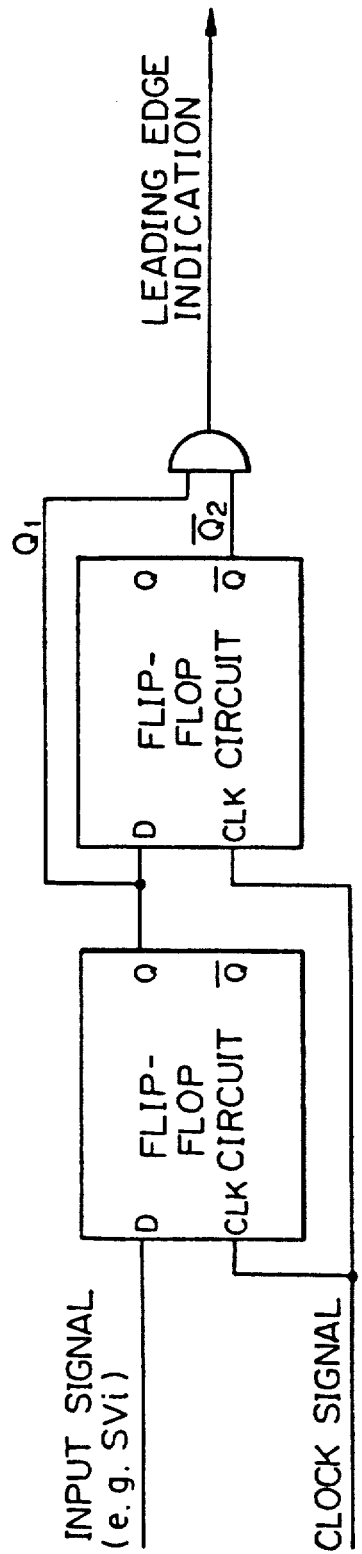
Fig. 13  LEADING EDGE DETECTOR
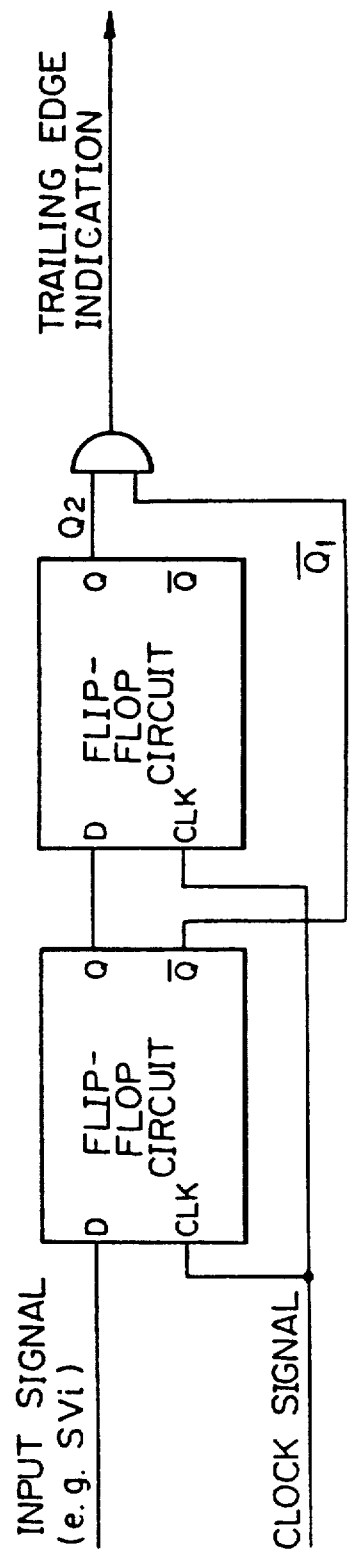
Fig. 14  TRAILING EDGE DETECTOR

SIGNAL FRAME FOR TRANSMISSION

F: FOR FRAME SYNCHRONIZATION
C: CONTROL PORTION, DATA PORTION NATURE INDICATION, COMMUNICATION BETWEEN 1ST & 2ND DEVICES
D: TRANSMISSION OF DATA PORTION, TRANSFER DATA etc.

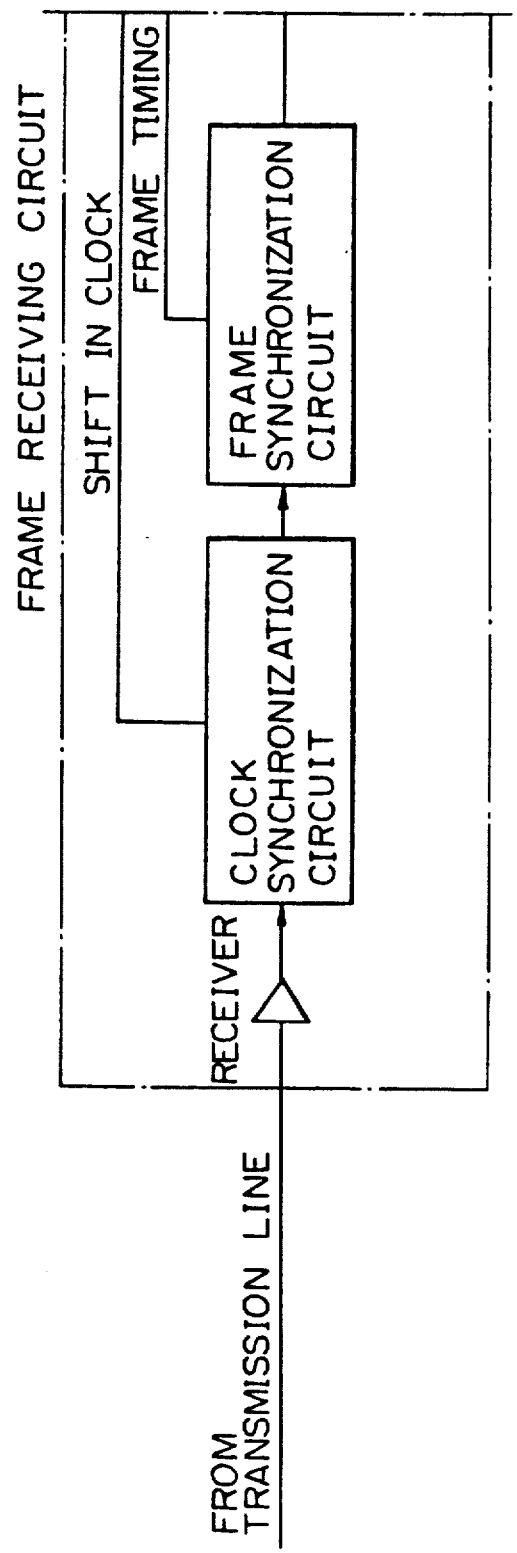

DATA TRANSFER SYSTEM HAVING TRANSFER DISCRIMINATION CIRCUIT

BACKGROUND OF THE INVENTION

1. Field of the Invention

The present invention is related to a data transfer system having a transfer discrimination circuit. The system according to the present invention is applicable to a usual or common computer system having a central part at a central location and input/output devices (I/O devices) at remote locations.

2. Description of Related Art

In general, there are two kinds of data transfer used for the channel interface to a computer, i.e., a interlock data transfer in which a maximum transfer speed of 1.5 megabytes per second is attained for a distance of about 5 to 10 m between the input/output channel device and the input/output device (I/O device), and a data streaming feature (DSF) data transfer in which a maximum transfer speed of 3 megabytes per second is attained for a distance of about 120 m between the input/output channel device and the I/O device. In the procedure for the signals in the channel interface, there are no rules prescribed by the computer manufacturer for the signal or the procedure which indicates which of these two kinds of data transfer is being used.

Where an arrangement is used for extending the distance between the input/output channel device and the I/O device, it is necessary to discriminate which data transfer, the interlock data transfer or the DSF data transfer, is being carried out, to realize a satisfactory data transfer.

In general, the interface procedure of the input/output channel device is the same for either of these data transfers, and the data transfer is satisfactorily carried out by the input/output channel device without concern for by which data transfer, the interlock data transfer or the DSF data transfer, the data transfer is being carried out.

However, where the channel interface distance is increased by insertion of a serially connected transmission line, a distance extension device must be provided in the channel interface without disturbing the usual operation of the channel interface.

Therefore, to coincide the operation of the distance extension device with the I/O device, a problem arises in that it is necessary to discriminate by which data transfer, the interlock data transfer or the DSF data transfer, the data transfer is being carried out.

DISCLOSURE OF THE INVENTION

It is an object of the present invention to provide an improved data transfer system having a transfer type discrimination circuit which is able to discriminate between the interlock data transfer and the DSF data transfer without adverse affect on the operation of the channel interface.

In accordance with an aspect of the present invention, there is provided a data transfer system having a transfer discrimination circuit for discriminating the type of data transfer used between an input/output channel device and I/O devices for a computer, in which the transfer type discrimination circuit includes an edge detection unit operating; in response to a tag signal supplied thereto, to detect a trailing edge of the tag signal after a leading edge of the tag signal has passed. The edge detection unit has a leading edge detector, a trailing edge detector, a storage element, and logic gate circuits. Also included is a timing unit operating in response to the output of the edge detection unit to count a predetermined length of time. A discrimination storage unit operates in response to the output of the timing unit to deliver an output indicating one type of data transfer or an output indicating the other type of data transfer.

BRIEF DESCRIPTION OF THE DRAWINGS

In the drawings,

FIG. 11 including 11A and 11B shows the structure of the second distance extension device used in the data transfer system of FIG. 9;

FIG. 13 shows an example of the structure of the leading edge detector;

FIG. 14 shows an example of the structure of the trailing edge detector;

DESCRIPTION OF THE PREFERRED EMBODIMENTS

Before describing the preferred embodiment of the present invention, a prior art data transfer system will be described with reference to FIGS. 1A, 1B, 2, and 3. The operation of the system of FIG. 1A is illustrated by the waveforms for the interlock data of FIG. 2 and by the waveforms for the DSF data transfer of FIG. 3.

Figure 1:
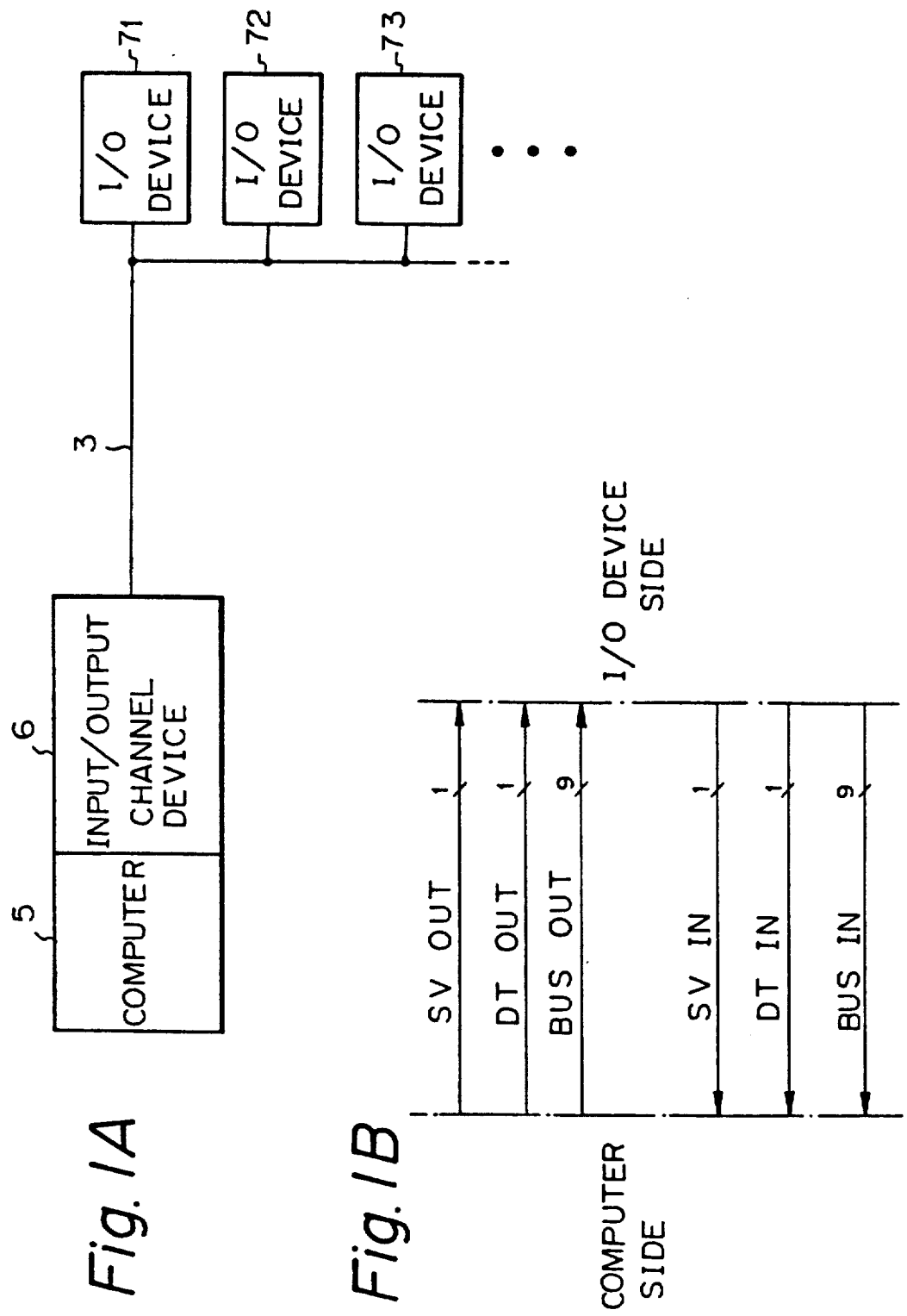
FIG. 1A shows a data transfer system for a computer to which the system according to the present invention is applied.
FIG. 1B shows an exchange of tag signals through signal lines and of data through data buses between the computer side and the I/O device side in the data transfer system of FIG. 1A.

In the system of FIG. 1A, a data transfer is carried out between the input/output channel device 6 connected to the computer 5, and the input/output terminal devices (I/O devices). As shown in FIG. 1B, the service out signal (SV OUT), the data out signal (DT OUT), an the bus out signal (BUS OUT) are transferred from the computer side to the input/output terminal device side, and the service in signal (SV IN), the data in signal (DT IN), and the bus in signal (BUS IN) are transferred from the input/output terminal device side to the computer side.

Figure 2:
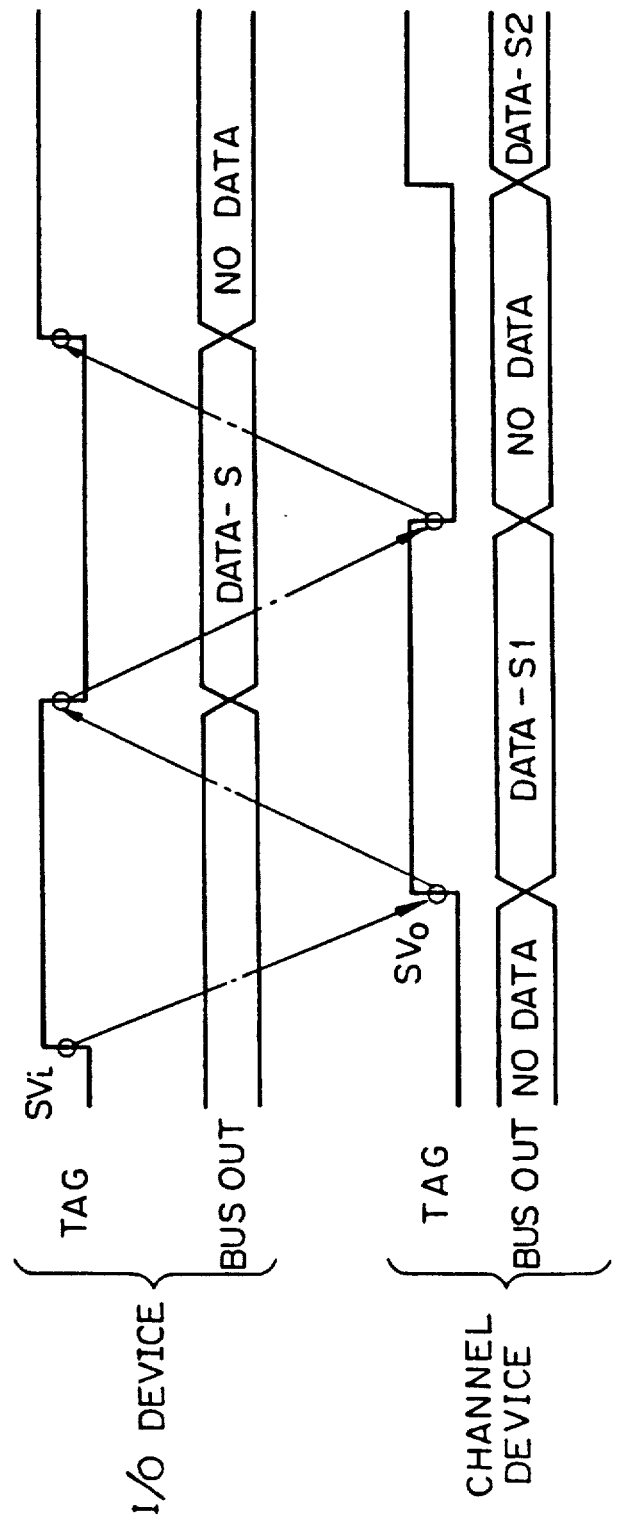
FIG. 2 shows a process of signal exchange between the I/O device side and the input/output channel device side by the interlock data transfer.

The write operation according to the interlock data transfer is illustrated in FIG. 2. The tag or synchronization signal $SV_i$, which is delivered from the I/O device and transmitted through the transfer line, is detected by the input/output channel device. Upon receipt of this $SV_i$, the input/output channel device delivers the signal $SV_0$ together with 1 byte of data through the bus line. When the I/O device detects this $SV_0$ from the input-/output channel device and receives data sent from the input/output channel device, the I/O device terminates the signal $SV_i$. When this termination of the signal $SV_i$ is detected by the input/output terminal device, the input/output terminal device terminates the signal $SV_0$. Thus, a transfer of 1 byte of data is completed. This transfer of 1 byte of data is then repeated.

The operation of the data transfer from the I/O device to the input/output channel device is carried out in the same way. That is, when the signal $SV_i$ is transmitted from the I/O device to the input/output channel device, a transmission of 1 byte of data is carried out.

Figure 3:
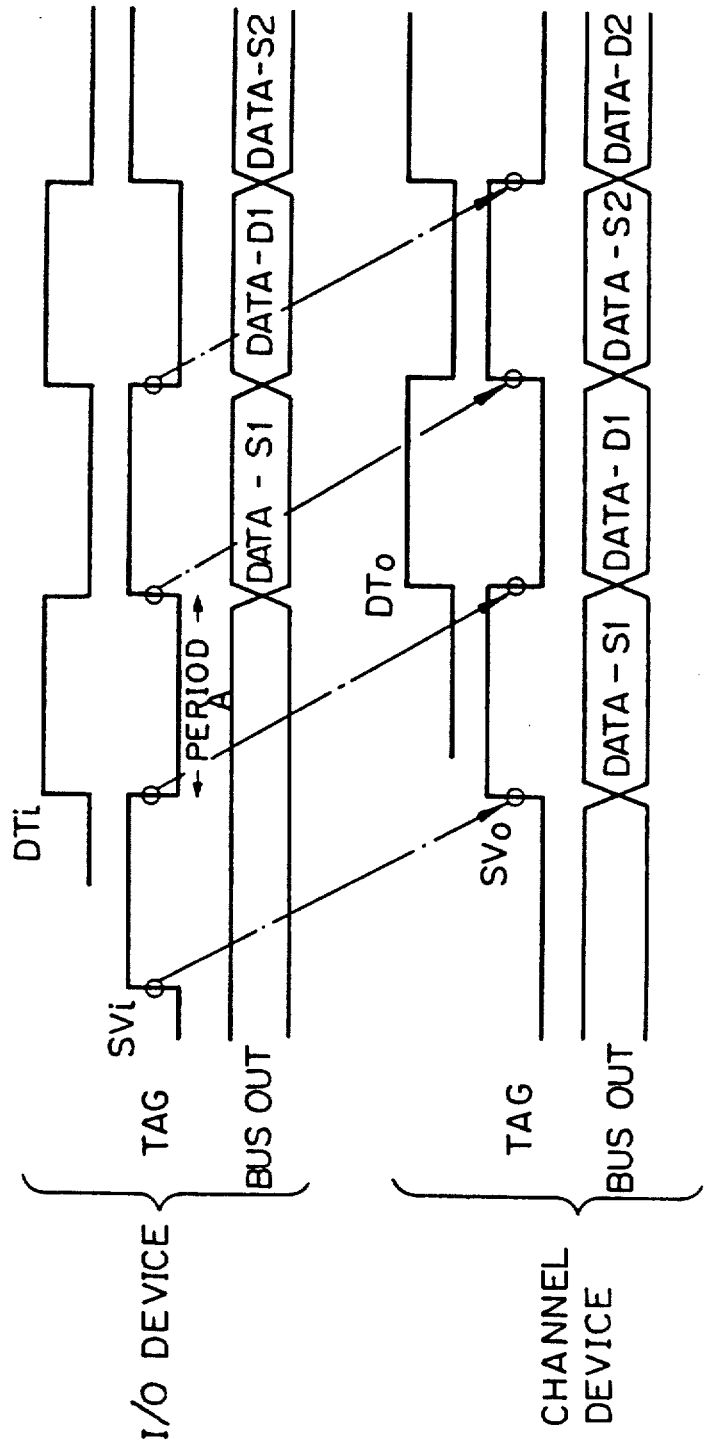
FIG. 3 shows a process of a signal exchange between the I/O device side and the input/output channel device side by the DSF data transfer.

In FIG. 3, the operation according to the DSF data transfer is illustrated. The tag signal $SV_i$ is delivered from the I/O device to request a supply of data. The I/O device maintains the $SV_i$ in an ON state for a predetermined time and terminates the $SV_i$, without awaiting the delivery of $SV_0$ from the input/output channel device. This predetermined time of the ON state of the $SV_i$ is more than about 270 ns. After an elapse of an OFF state of the $SV_i$ of a predetermined time, for example, a minimum 270 ns, a signal $SV_i$ is again delivered. After an elapse of an ON state of the $SV_i$ of the same predetermined time as described before, the $SV_i$ is terminated. This sequence of operations is then repeated.

The operation of the input/output channel device is the same as the operation in the case of the interlock data transfer system. Upon receipt of $SV_i$ from the I/O device, the input/output channel device delivers a signal $SV_0$ and data toward the I/O device. After an elapse of about 270 ns, the termination of $SV_i$ is detected. Upon detection of this termination of $SV_i$, the signal $SV_0$ is terminated. This sequence of operations is then repeated.

The input/output device does not terminate the delivery of $SV_i$ in accordance with the detection of $SV_0$ but independently of the detection of $SV_0$. In the data streaming type system, when only the signal $SV_i$ is used, the data transfer is not carried out during the period A of the signal $SV_i$. Accordingly, to increase the efficiency of the transfer of data, the signal $DT_i$ is used in addition to the signal $SV_i$.

Figure 4:
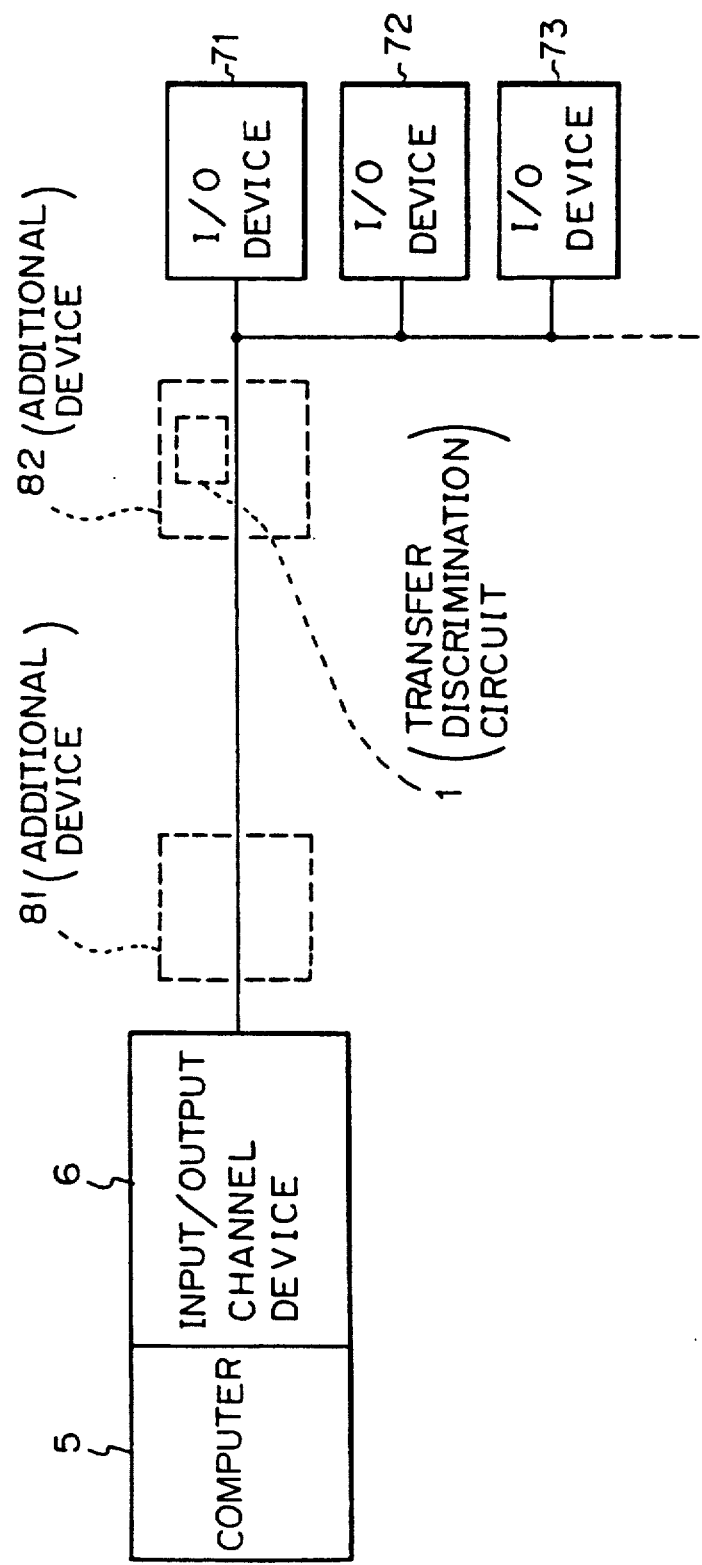
FIG. 4 shows a data transfer system for a computer according to an embodiment of the present invention to which a transfer discrimination circuit is applied.

A data transfer system for a computer according to an embodiment of the present invention to which a transfer discrimination circuit is applied is shown in FIG. 4. The structure of a typical transfer discrimination circuit in this data transfer system is shown in FIG. 5.

The system of FIG. 4 includes a computer 5, an input-/output channel device 6, input/output terminal devices (I/O devices) 71, 72, 73 . . . , an additional device 81 for distance extension at the input/output channel device side, and an additional device 82 for distance extension at the I/O device side where devices 81 and 82 form an extended communication path. A transfer discrimination circuit 1 is provided in the additional device 82.

Figure 5:
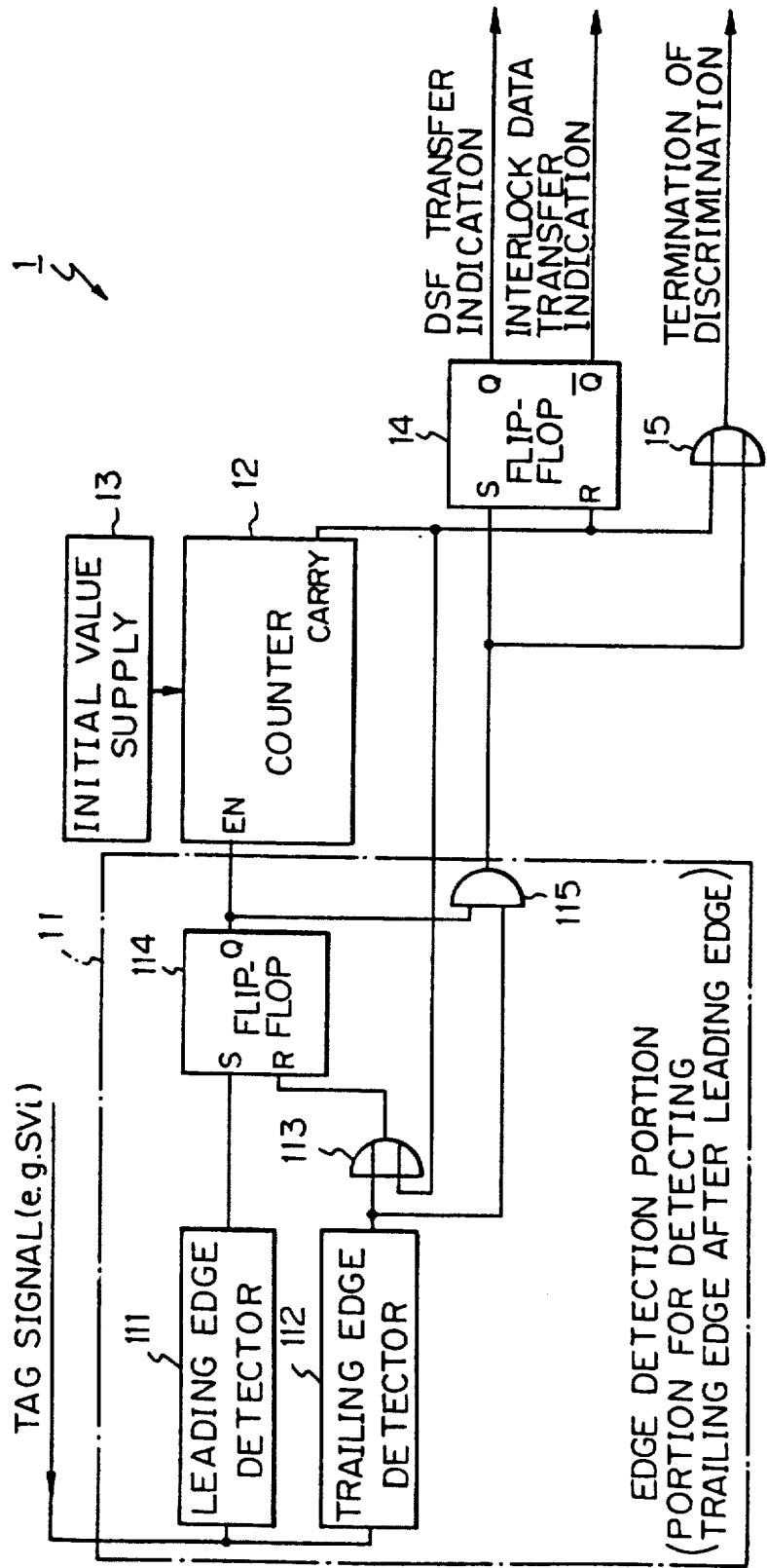
FIG. 5 shows the structure of a typical transfer discrimination circuit in a data transfer system for a computer according to the embodiment of the present invention shown in FIG. 4.

The transfer discrimination circuit 1 shown in FIG. 5 includes an edge detection portion 11 having a leading edge detector 111, a trailing edge detector 112, an OR gate 113, a flip-flop circuit 114, and an AND gate; a counter 12; an initial value supply portion 13; a flip-flop circuit 14; and an OR gate 15.

The leading edge detector 111 receives a tag signal such as $SV_i$ and delivers an output signal to the set input terminal of the flipflop circuit 114. The trailing edge detector 112 receives a tag signal such as $SV_i$ and delivers an output signal to an OR gate 113 and the AND gate 115. The output of the OR gate 113 is supplied to the reset input terminal of the flip-flop circuit 114, and the output of the flip-flop circuit 114 is supplied to the AND gate 115.

Through the enable input terminal, the counter 12 receives the output of the flip-flop circuit 114, and delivers an output signal to the reset input terminal of the flip-flop circuit 14 and the OR gate 15. The output of the AND gate 15 is supplied to the set input terminal of the flip-flop circuit 14 and the AND gate 15. The Q output terminal of the flip-flop circuit 14 delivers a signal indicating a DSF data transfer. The $\overline{Q}$ (barred Q) output terminal of the flip-flop circuit 14 delivers a signal indicating a interlock data transfer. The OR gate 15 delivers a signal indicating the termination of the discrimination.

Figure 6:
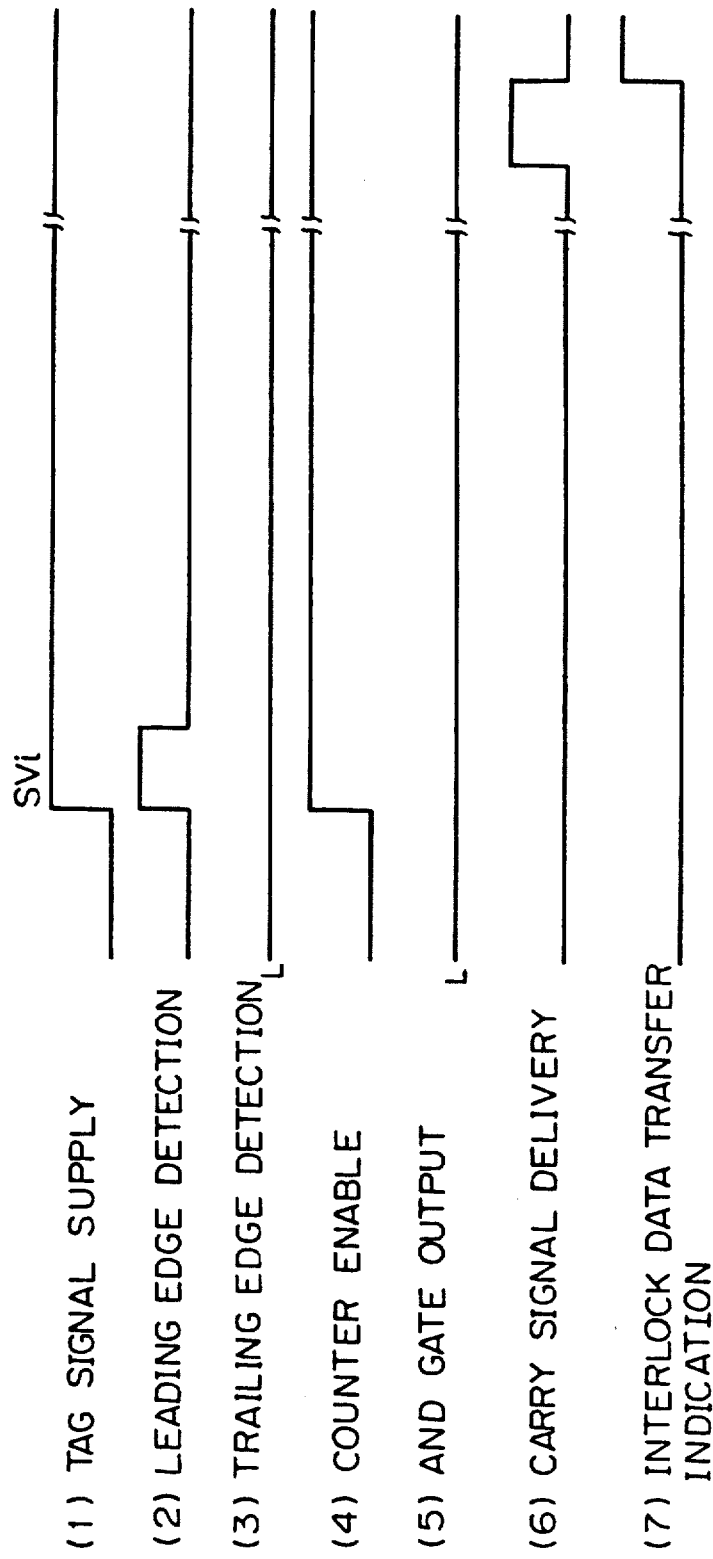
FIGS. 6 and 7 show the waveforms of signals in the transfer discrimination circuit shown in FIG. 5.

The operation of the transfer discrimination circuit 1 of FIG. 5 in the case of the interlock data transfer will be described with reference to FIG. 6. A tag signal $SV_i$ is supplied to the leading edge detector 111 and the trailing edge detector 112 (FIG. 6, (1)). The output signal of the leading edge detector 111 is supplied to the flip-flop circuit 114 (FIG. 6, (2)). The potential of the output of the trailing edge detector 112 is maintained at the LOW level. (FIG. 6, (3)). The enable input signal is still supplied to the counter 12 (FIG. 6, (4)). The potential of the output signal of the AND gate 115 is maintained LOW (FIG. 6, (5)). After a relatively long time such as 2 µs, a carry signal indicating an overflow of the counter is delivered from the counter 12 (FIG. 6, (6)). The flip-flop circuits 114 and 14 are reset by this carry signal to initialize the counter 12. When the flip-flop circuit 14 is reset, the signal at a HIGH potential is delivered from $\overline{Q}$ output terminal of the flip-flop circuit 14 (FIG. 6, (7)). This signal at the HIGH potential from $\overline{Q}$ output terminal indicates an interlock data system.

Figure 7:
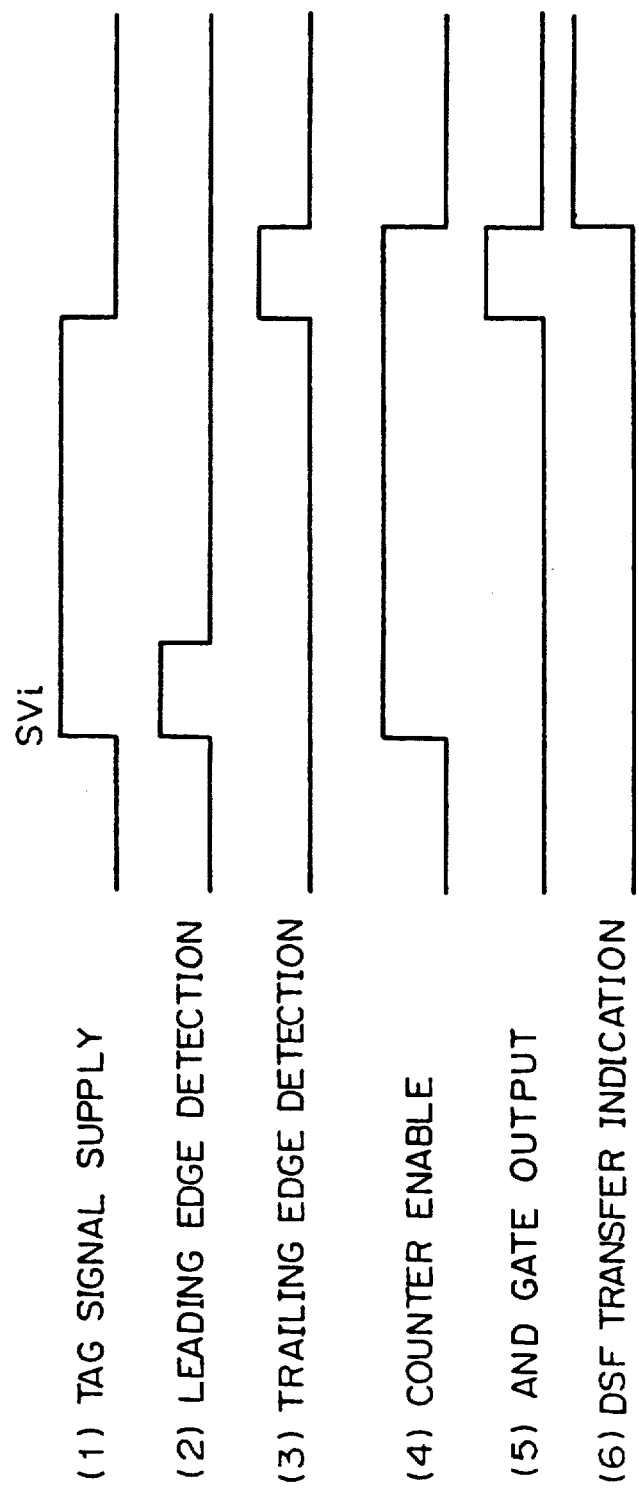

The operation of the transfer discrimination circuit 1 of FIG. 5 in the case of the DSF data transfer will be described with reference to FIG. 7. A tag signal $SV_i$ is supplied to the leading edge detector 111 and the trailing edge detector 112 (FIG. 7, (1)). The output of the leading edge detector 111 is supplied to the set input terminal of the flip-flop circuit 114 (FIG. 7, (2)). The output of the trailing edge detector 112 is supplied to the reset input terminal of the flip-flop circuit 114 and the AND gate 115 (FIG. 7, (3)). The enable signal is still supplied to the counter 12 from the leading edge detect pulse to the trailing edge detect pulse (FIG. 7, (4)). The counter 12 counts down from the initial value previously supplied from the initial value supply portion 13. When the trailing edge detector 112 delivers the trailing edge detect pulse (FIG. 7, (3)), a HIGH potential signal from the AND gate 115 is supplied to the set input terminal of the flip-flop circuit 14 (FIG. 7, (5)) to cause a delivery of a HIGH potential output signal from Q output terminal of the flip-flop circuit 14 (FIG. 7, (6)). This HIGH potential signal from the Q output terminal indicates the DSF data transfer.

The flip-flop circuit 114 is reset by the output signal of the trailing edge detector 112 supplied to the reset input terminal of the flip-flop circuit 114, so that the counter 12 stops the counting and returns to the initial state.

The initial value of the counter 12 is selected by the initial value supply portion 13. The initial value of the counter is a value such that an overflow of the count value occurs upon completion of a counting operation for a time corresponding to a predetermined time.

Figure 8:
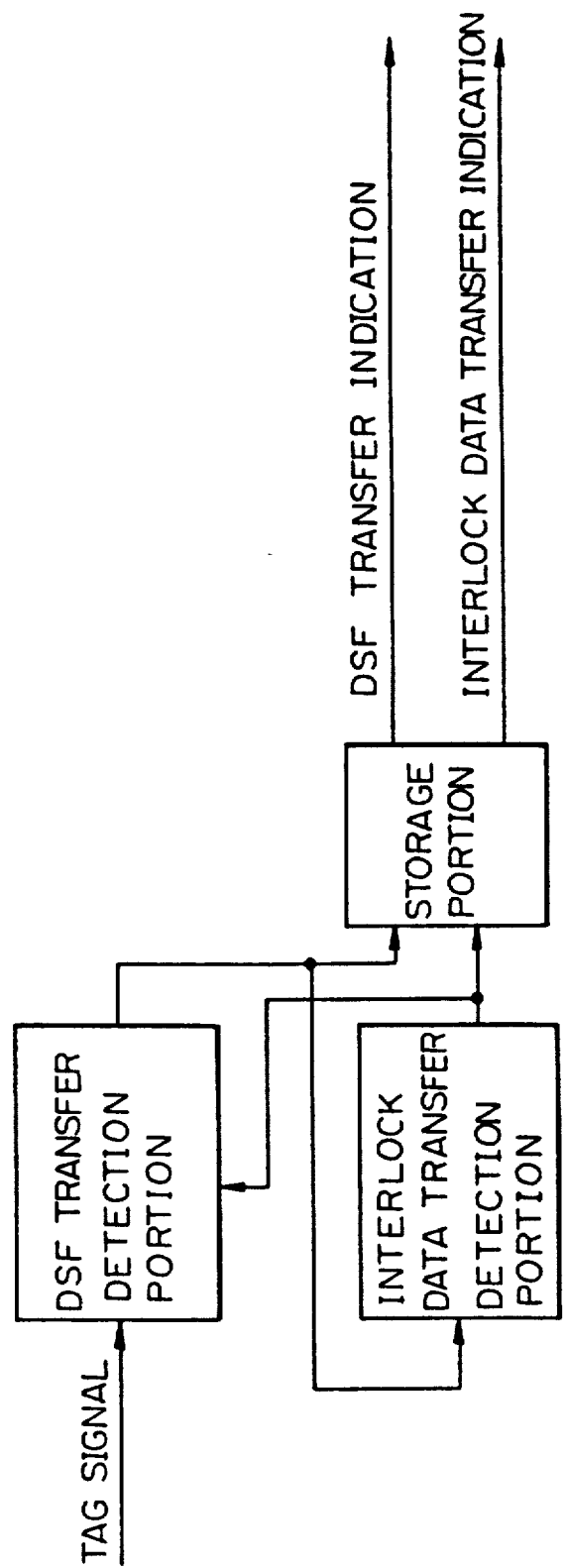
FIG. 8 shows a diagram expressing the operation of the transfer discrimination circuit in a data transfer system for a computer according to an embodiment of the present invention, from one viewpoint.

From one point of view, the data transfer discrimination circuit used in the present invention may also be expressed by a diagram shown in FIG. 8. The data transfer discrimination circuit shown in FIG. 8 includes a DSF data transfer detection portion, an interlock data transfer detection portion, and a storage portion. The DSF data transfer portion receives a tag signal and the output of the interlock data transfer detection portion. The interlock data transfer detection portion receives the output of the DSF data transfer detection portion. The storage portion receives the outputs of the DSF data transfer detection portion and the interlock data transfer detection portion, and delivers either an output for a DSF data transfer or an output for an interlock data transfer.

According to the viewpoint shown in FIG. 8, a data transfer discrimination circuit used for a data transfer between an input/output channel device and I/O devices for a computer includes a DSF data transfer detection portion for detecting a DSF data transfer by delivering an output as the result of detecting that the time between the leading edge and the trailing edge of a first tag signal transmitted from an I/O device to the input/output channel device falls within a predetermined time or length; an interlock data transfer detection portion for detecting an interlock data transfer by delivering an output as the result of detecting that the trailing edge of a first tag signal transmitted from an I/O device to the input/output channel device is not detected within the predetermined time after the leading edge of the first tag signal; and a storage portion for storing the output of the DSF data transfer detection portion or the output of the interlock data transfer detection portion.

Figure 9:
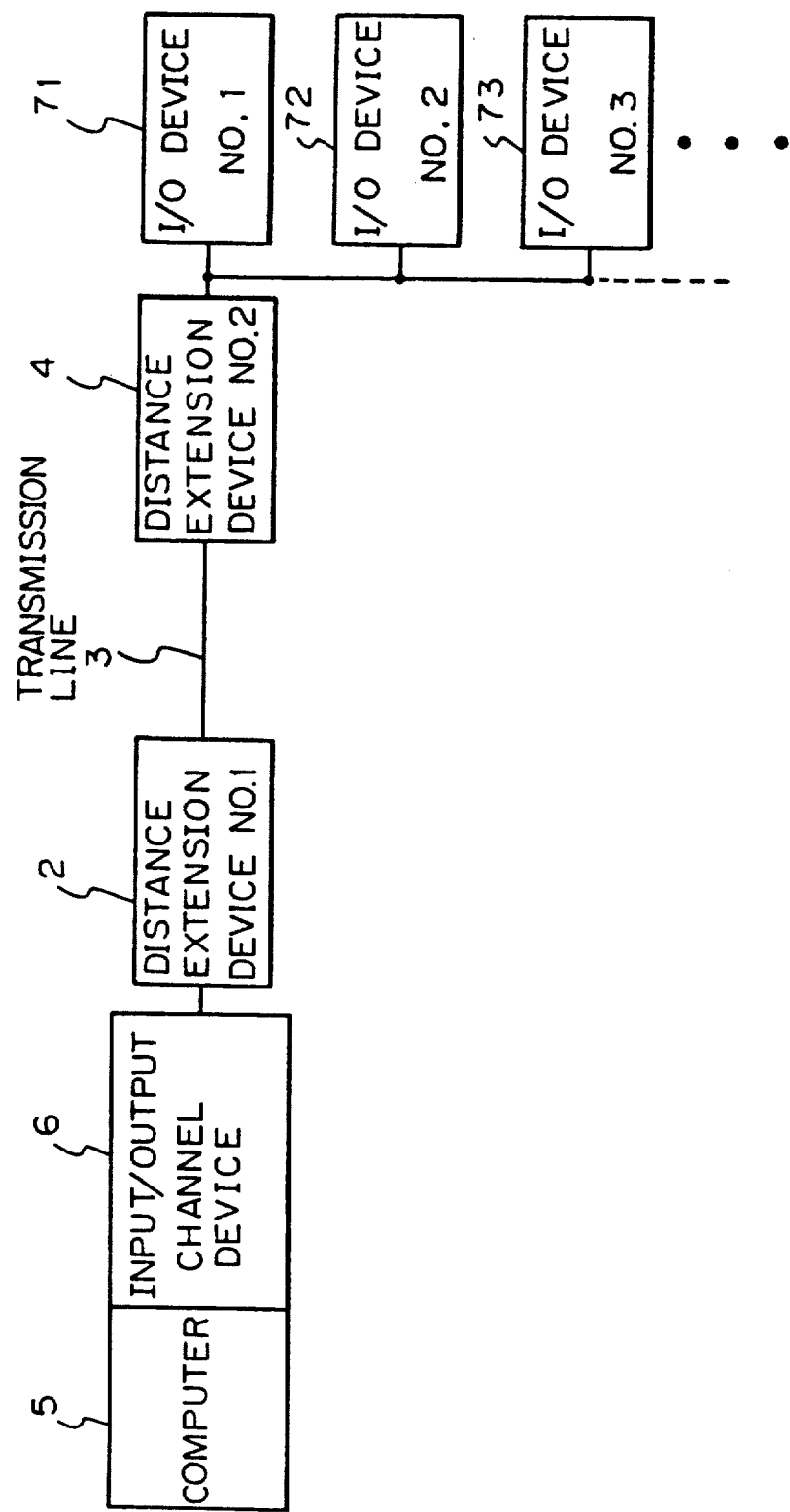
FIG. 9 shows a data transfer system for a computer according to another embodiment of the present invention in which first and second distance extension devices to which a transfer discrimination circuit is applied are provided.

A data transfer system for a computer according to another embodiment of the present invention is shown in FIG. 9. The structure of the No. 1 distance extension device used in the system of FIG. 9 is shown in FIG. 10, and the structure of the No. 2 distance extension device used in the system of FIG. 9 is shown in FIG. 11.

The system of FIG. 9 includes a computer 5, an input/output channel device 6, a No. 1 distance extension device 2, a transmission line 3, a No. 2 distance extension device 4, and I/O devices 71, 72, 73 . . . Parallel signals from the input/output channel device 6 are converted to a serial signal having a predetermined format by the No. 1 distance extension device 2, and the converted serial signal is transmitted through the transmission line 3 to the No. 2 distance extension device 4 in which the transmitted signal is again converted to the original parallel signals which are supplied to the I/O devices 71, 72, 73, . . . The data transmission from the I/O devices 71, 72, 73 . . . to the computer 5 is carried out in the same way.

In the system shown in FIG. 9, inter-channel distance extension devices are used for connecting I/O devices at locations remote from the host computer. The No. 1 distance extension device is and the No. 2 distance extension device are arranged to extend the inter-channel distance.

Figure 10B:
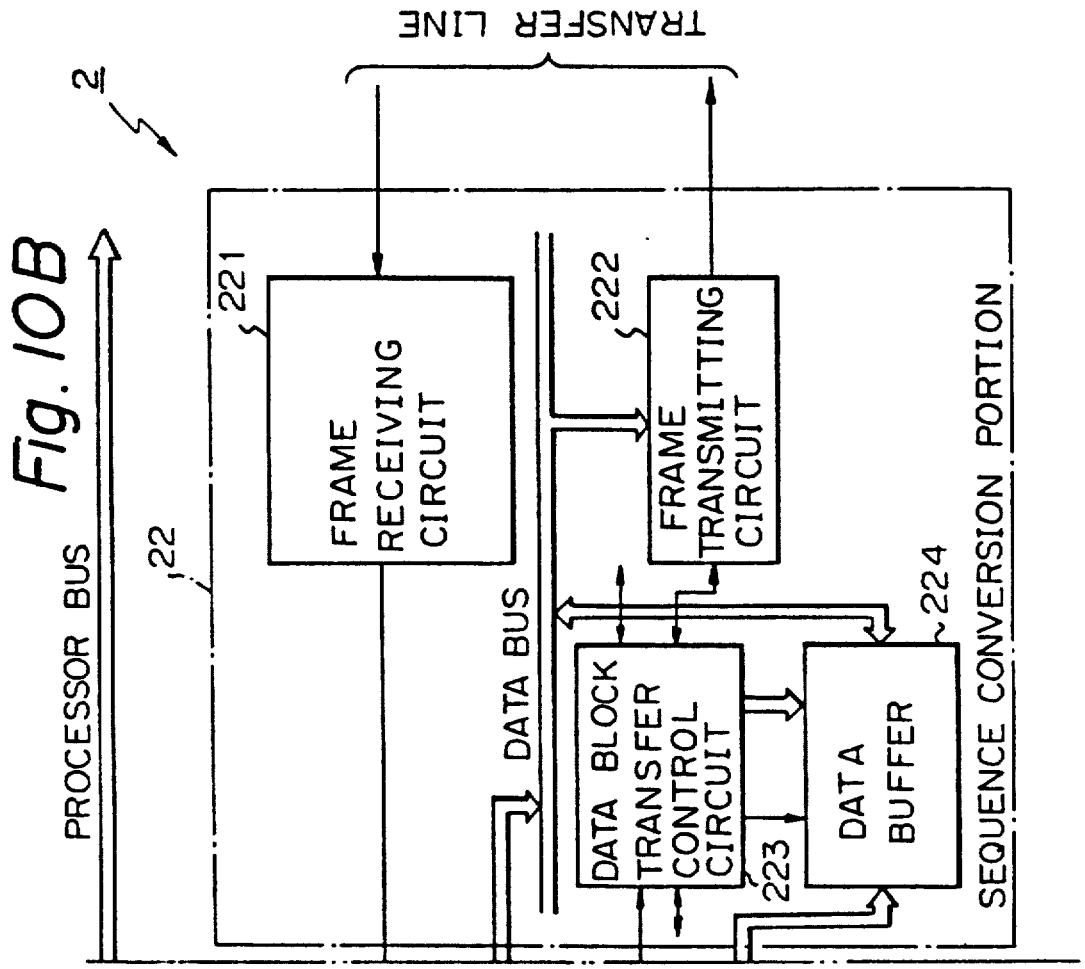
FIG. 10 including 10A and 10B shows the structure of the first distance extension device used in the data transfer system of FIG. 9.

As shown in FIG. 10, the No. 1 distance extension device 2 is includes a channel interface input/output portion 21, a transfer receiving and switching portion 23, a sequence conversion portion 22, and a CPU 24. The channel interface input/output portion 21 includes a tag receiving circuit 211, a tag transmitting circuit 212, and a transfer data input/output control portion 213. The transfer receiving and switching portion 23 includes an information receiving circuit 231 232, and a separation circuit. The sequence conversion portion 22 includes a frame receiving circuit 221, a frame transmitting circuit 222, a data block transfer control circuit 223, and a data buffer 224.

As shown in FIG. 11, the No. 2 distance extension device 4 includes a sequence conversion portion 42, a transfer determination portion 43, a channel interface input/output portion 41, and a CPU 44. The sequence conversion portion 42 includes a frame transmitting circuit 421, a frame receiving circuit 422, a data block transfer control circuit 423, and a data buffer 424. The transfer determination portion 43 includes a transfer discrimination portion 1, a synthesis circuit 431, an information receiving circuit 432, and a tag transmitting circuit 433. The channel interface input/output portion 41 includes a tag receiving circuit 411 and a transfer data input/output control circuit 412.

The operation of the devices of FIGS. 10 and 11 will be described. In the No. 2 distance extension device 4, a data transfer is carried out after a selection of an I/O device. The tag receiving circuit 411 is informed of the commencement of a data transfer by the CPU 44, which is monitoring the state of signals during the process. The transfer discrimination portion 1 controls switch 433a based on the discrimination made on the signal from circuit 411. The signal which is allowed to pass through switch 433a represents notification of receipt of the $TAG_i$ signal. This notification is output by circuit 411 when discrimination is complete.

The leading edge of the signal $TAG_i$, which is first supplied from an I/O device to the tag receiving circuit 411 during the data transfer, is detected by the transfer discrimination portion 1. However, since the switch 433a is OFF, the signal $TAG_0$ corresponding to the signal $TAG_i$ is not transmitted from the tag transmitting circuit 433.

In this situation, if the data transfer of the I/O device is carried out in the interlock data transfer, the signal $TAG_0$ is not transmitted, the signal $TAG_i$ remains in at a HIGH potential, and the trailing edge of the signal TAG$_0$ can not be detected. However, in the DSF data transfer, when a predetermined time has passed, the I/O device independently carries out a switching-off operation, and accordingly, the trailing edge of the signal can be detected.

While the detection operation is proceeding, the switch 433a is in an OFF state. When the detection operation is completed, the switch 433a is turned ON to enable communication between the I/O device and the No. 2 distance extension device 4.

When the transfer discrimination portion 1 detects that the present transfer is a DSF data transfer, a signal is generated in a predetermined form by the information receiving circuit 432 which generates information about the transfer, and a signal synthesis with the parallel data from the data buffer 424 is carried out in the synthesis circuit 431. The output of the synthesis circuit 431 is supplied to the frame transmitting circuit 421 in which the signals are converted to a series signal which is transmitted to the No. 1 distance extension device 2.

In the No. 1 distance extension device 2, the received signal is converted to parallel signals in the frame receiving circuit 221, and the DSF data transfer detection information is separated from the output of the frame receiving circuit 221 in the separation circuit 231. The separated DSF data transfer detection information is detected by the information receiving circuit 232, and the tag receiving circuit 411 and the tag transmitting circuit 433 are switched to become a tag receiving and transmitting circuit for a DSF data transfer by a switch (not shown). Note, when the information indicates an interlock data transfer, this switching is not carried out.

Figure 12:
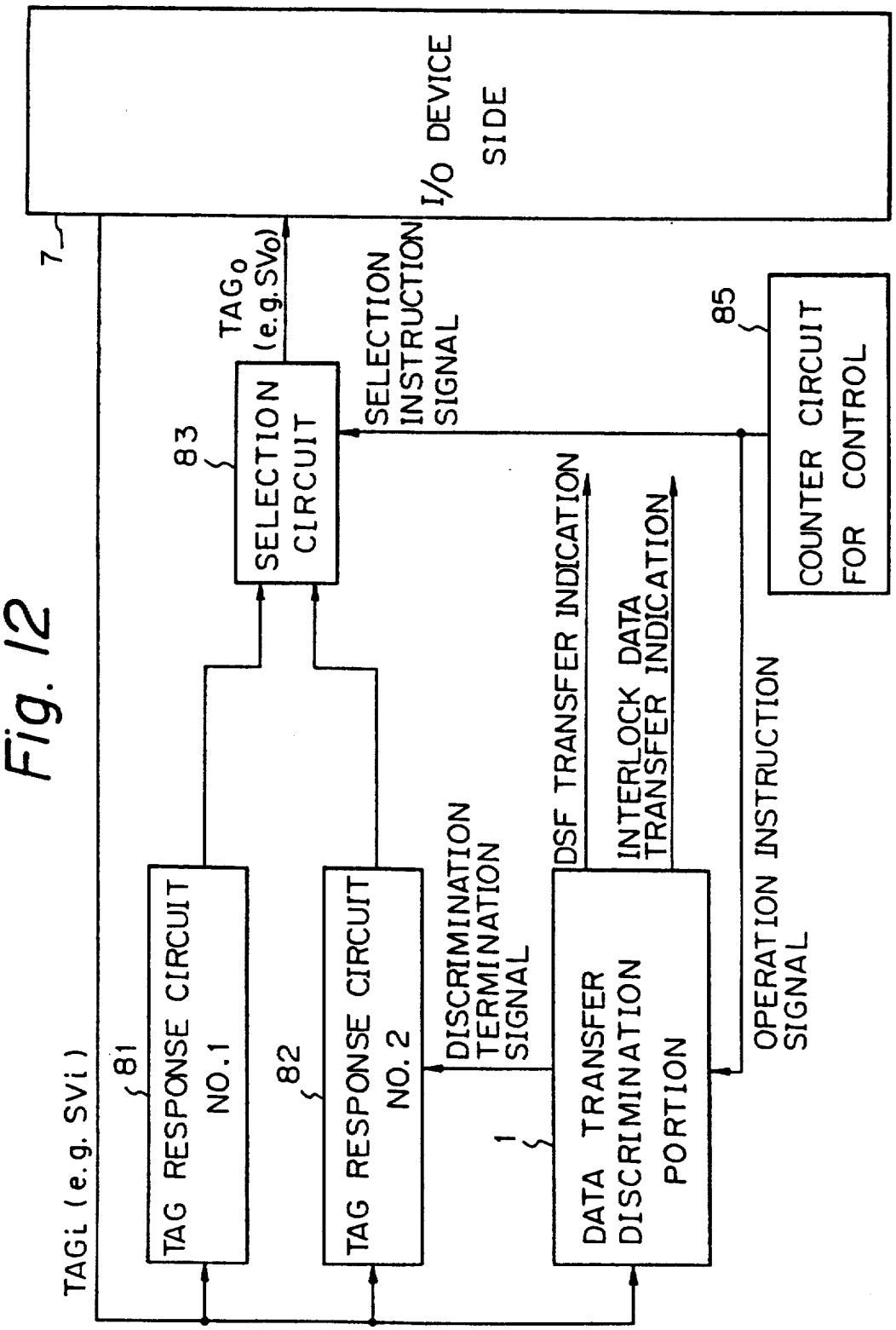
FIG. 12 shows a data transfer system for a computer according to a further embodiment of the present invention.

A data transfer system for a computer according to a further embodiment of the present invention is shown in FIG. 12. The system of FIG. 12 includes a No. 1 tag response circuit 81 which is operated with a normal timing for the tag signal TAG$_i$ from the I/O device, a No. 2 tag response circuit 82, which is operated at a timing delayed from the normal timing for the tag signal TAG$_i$ from the I/O device, a selection circuit 83, a counter circuit 85 for control, and a data transfer discrimination portion 1. The data transfer discrimination portion 1 in the system of FIG. 12 is fundamentally the same as the device of FIG. 5.

One of the No. 1 tag response circuit 81 and No. 2 tag response circuit 82 is selected by the selection circuit 83, so that one of the outputs from the No. 1 tag response circuit 81 and No. 2 tag response circuit 82 is supplied as the tag signal T from the selection circuit 83 to the I/O device side 7.

The counter circuit 85, for providing control periodically operates the selection circuit 83 and the transfer discrimination portion 1. The counter circuit 85 is, for example, a time measuring counter which counts, for example, a time of 1 ms. In the counter circuit 85, for example, one count is carried out per one hundred tag signals SV$_i$.

The operation of the system of FIG. 12 will be described. It is presumed that the selection of I/O devices and the data transfer concerning command transmission has been completed as the preliminary processing.

First, the selection terminal device makes the potential of SV$_i$ or DT$_i$ as the tag signal HIGH, and, in accordance with this tag signal TAG$_i$, only one of the No. 1 tag response circuit 81 and the No. 2 tag response circuit 82 is operated.

That is, when the counter circuit 85, for providing control, is delivering a LOW level potential signal as an OFF signal, the selection circuit 83 operates the No. 1 tag response circuit 81, and the tag signal TAG$_i$ is supplied as a response tag signal TAG$_0$ to the I/O device without delay. Conversely, when the counter circuit 85 for control is delivering a HIGH level potential signal as an ON signal, the selection circuit 83 operates the No. 2 tag response circuit 82 and the transfer discrimination portion 1.

Thus, the OFF signal from the counter circuit 85 for control operates as a selection instruction signal from the No. 1 tag response circuit 81 to the selection circuit 83, and the ON signal from the counter circuit 85 for control operates as a selection instruction signal from the No. 2 tag response circuit 82 to the selection circuit 83 as well as an operation instruction signal to the transfer discrimination circuit 1.

The transfer discrimination portion 1 receives the operation instruction signal from the counter circuit 85 for control and, based on the tag signal TAG$_i$ from the I/O device, carries out a discrimination between the DSF data transfer and the interlock data transfer. During that discrimination operation, the response to the tag signal TAG$_i$ in the No. 2 tag response circuit is delayed.

Upon completion of the discrimination between the DSF data transfer and the interlock data transfer, the transfer discrimination portion 1 delivers either a DSF data transfer indication signal or an interlock data transfer indication signal, as a result of the discrimination, and supplies the No. 2 tag response circuit 82 with the discrimination termination signal. As a result, the No. 2 tag response circuit 82 supplies the response signal TAG$_0$ of the tag signal TAG$_i$ to the I/O device. In other words, the tag response is delayed.

Upon completion of the operation, the transfer discrimination circuit 1 supplies the No. 2 tag response circuit 82 with the discrimination termination signal, and as a result, the No. 2 tag response circuit 82 supplies the response signal TAG$_0$ to the I/O device through the selection circuit 83 in response to the tag signal TAG$_i$ from the I/O device.

Thus, the data transfer from the I/O device side to No. 2 distance extension device is periodically discriminated.

Figure 15:
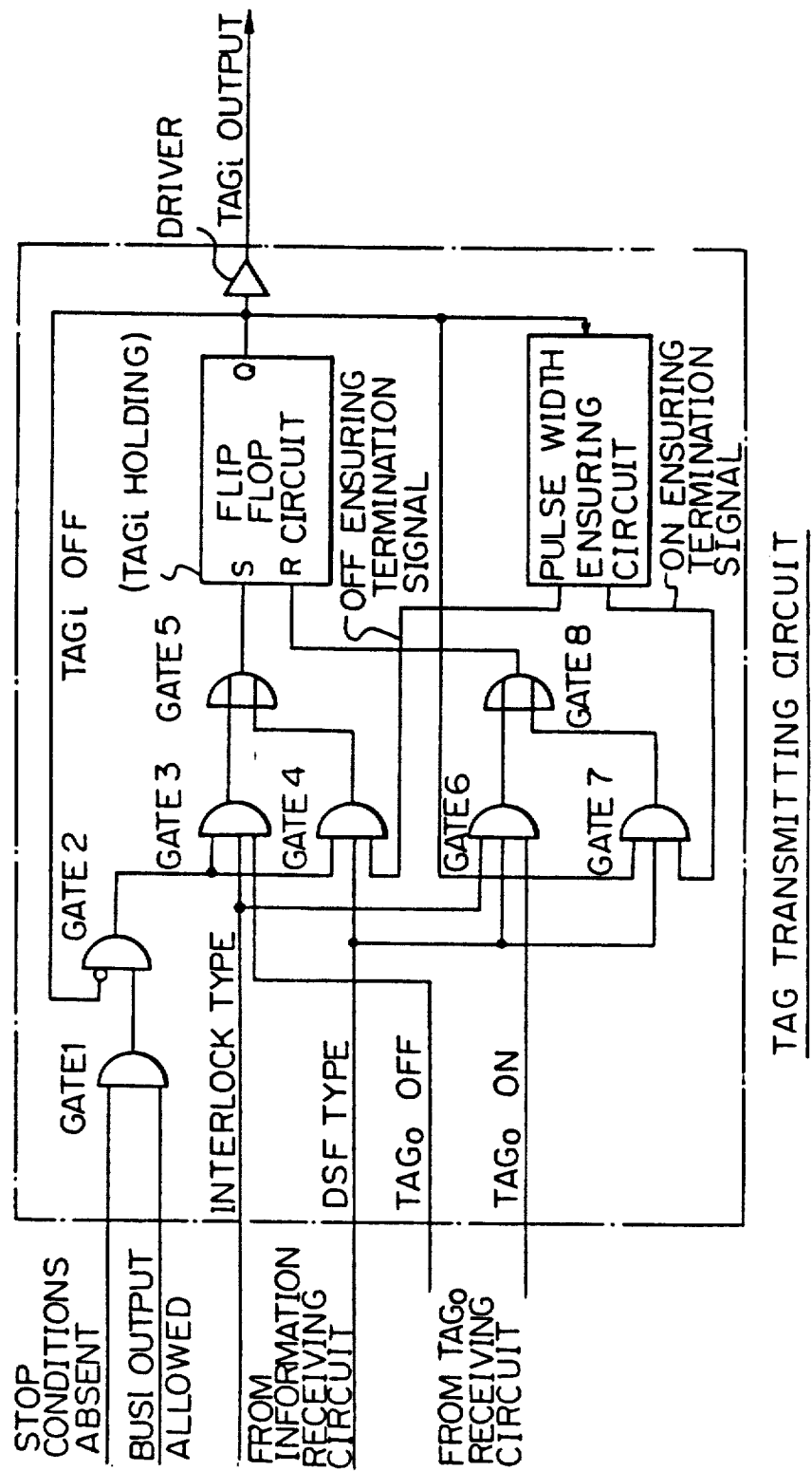
FIGS. 15 and 16 show examples of the structure of the tag transmitting circuit.
Figure 16:
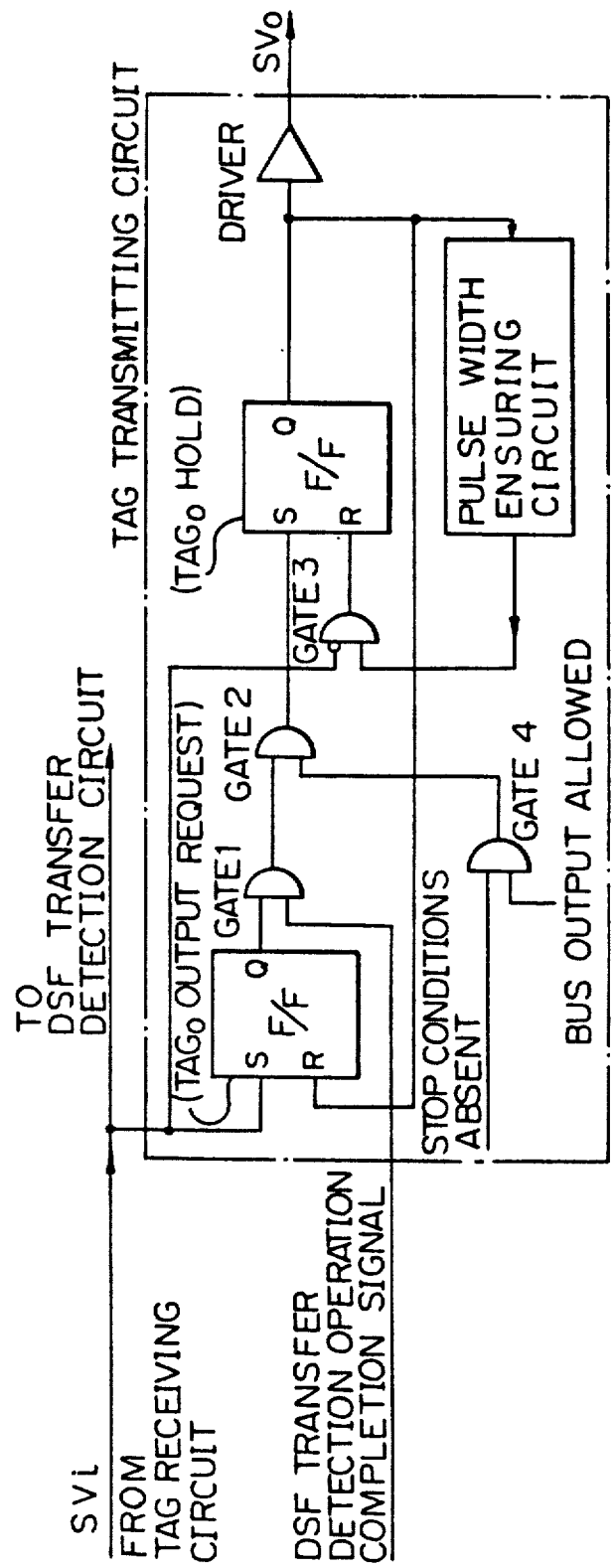
Figure 17:
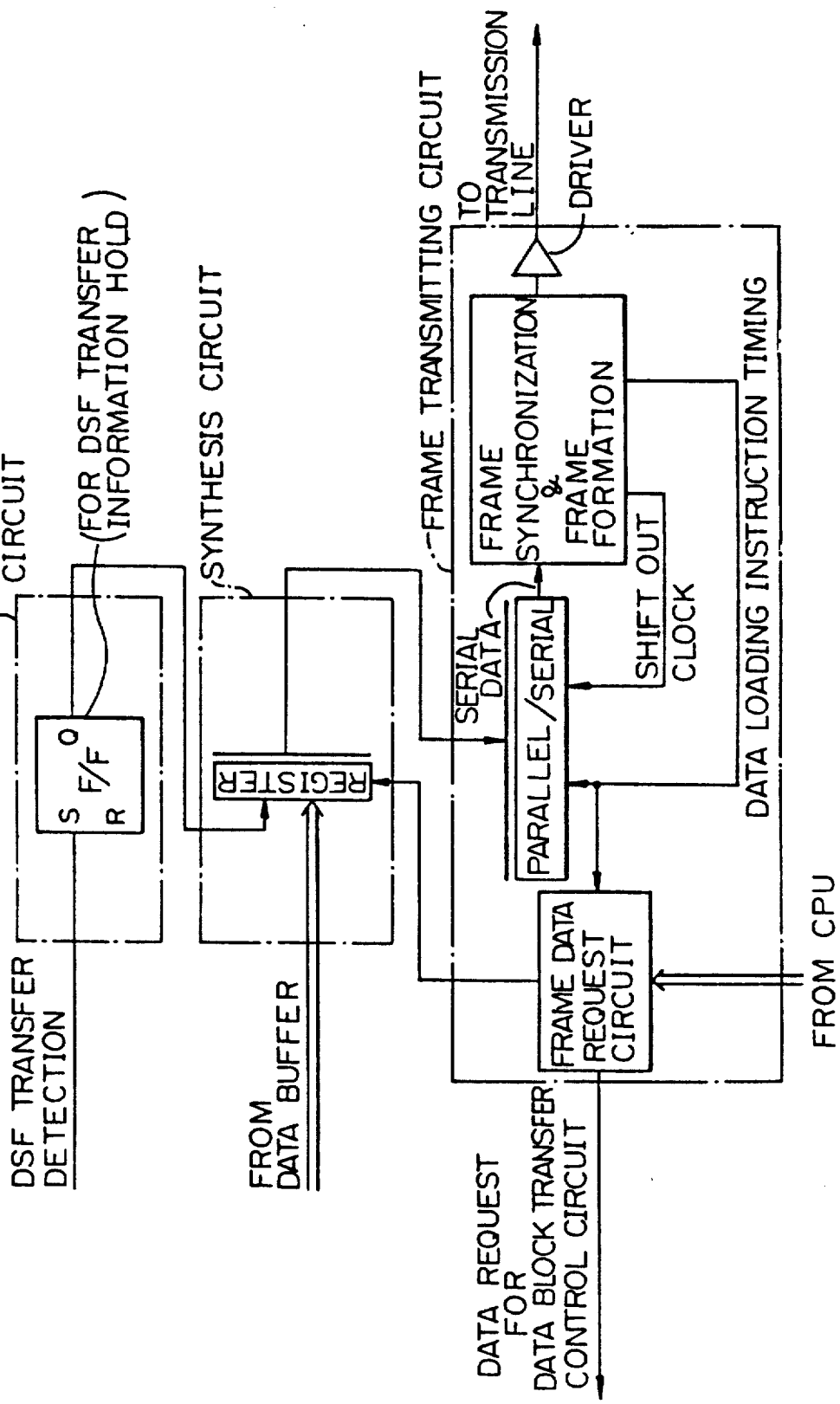
FIG. 17 shows an example of the structures of the information receiving circuit, the synthesis circuit, and the frame transmitting circuit.
Figure 18:
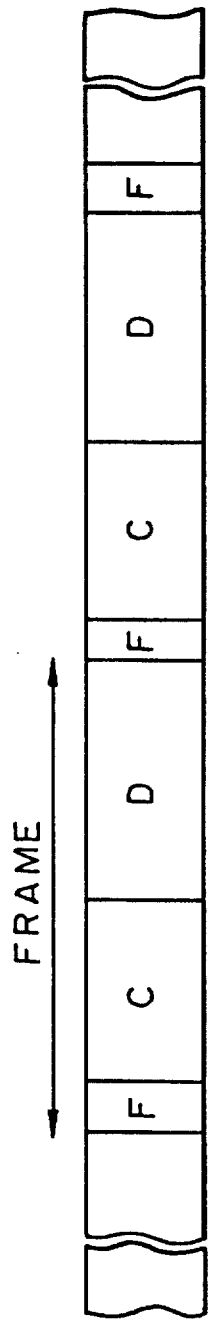
FIG. 18 shows an example of the pattern of a signal frame for transmisssion.
Figure 19B:
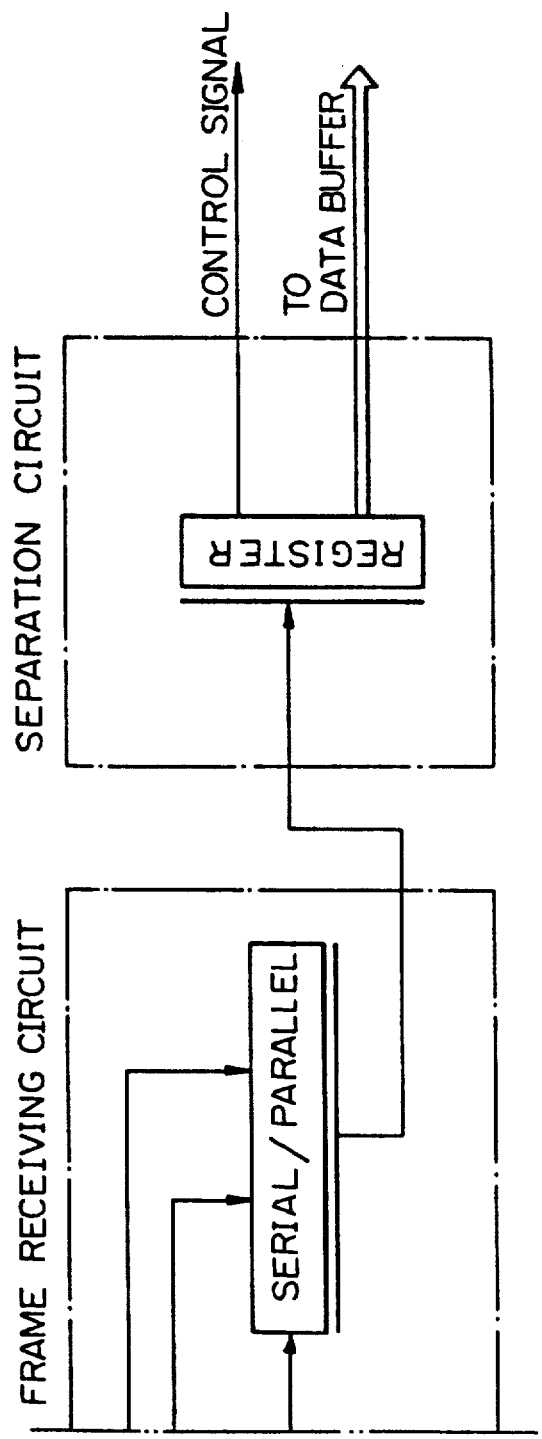
FIG. 19 including 19A and 19B shows an example of the structures of the frame receiving circuit and the separation circuit.

An example of the structure of the leading edge detector 111 in the system of FIG. 5 is shown in FIG. 13; an example of the structure of the trailing edge detector 112 in the system of FIG. 5 is shown in FIG. 14; an example of the structure of the tag transmitting circuit 212 in the system of FIG. 10 is shown in FIG. 15; and an example of the structure of the tag transmitting circuit in the system of FIG. 11 is shown in FIG. 16. Examples of the structures of the information receiving circuit 432, the synthesis circuit 431, and the frame transmitting circuit 421 in the system of FIG. 11 are shown in FIG. 17. An example of the pattern of a signal frame for transmission for the circuit of FIG. 17 is shown in FIG. 18, and examples, of the structures of the frame receiving circuit 422 and the separation circuit 231 are shown in FIG. 19.

The leading edge detector 111 shown in FIG. 13 is constituted by first and second flip-flop circuits and an AND gate. The first flip-flop circuit 1111 receives an input signal, for example, SV$_i$, and a clock signal. The second flip-flop circuit 1112 receives a Q output of the first flip-flop circuit 1111 and the clock signal. The AND gate 1113 receives a Q output signal of the first flip-flop circuit 1111 and a $\overline{Q}$ output signal of the second flip-flop circuit 1112. The AND gate 1113 delivers the leading edge indication signal.

The trailing edge detector 112 shown in FIG. 14 is constituted by first and second flip-flop circuits and an AND gate. The first flip-flop circuit 1121 receives an input signal, for example, $SV_i$, and a clock signal. The second flip-flop circuit 1122 receives a Q output of the first flip-flop circuit 1121 and the clock signal. The AND gate 1123 receives a $\overline{Q}$ output signal of the first flip-flop circuit 1121 and a Q output signal of the second flip-flop circuit 1122. The AND gate 1123 delivers the trailing edge indication signal.

The tag transmitting circuit 212 shown in FIG. 15 includes gate Nos. 1 to 8, a flip-flop circuit 2121, a pulse width ensuring circuit 2122, and a driver 2123; In the operation of the circuit 222 of FIG. 15, first the interlock data transfer indication signal is supplied from the information receiving circuit. The gate Nos. 1 and 2 check this condition. When the result of the check is affirmative, the $TAG_i$ set circuit including gate Nos. 3 to 5 and the $TAG_i$ reset circuit including gate Nos. 6 to 8 are enabled. In the case of an interlock data transfer, the set condition is established by gate Nos. 3 and 5, and the reset condition is established by gate Nos. 6 and 8. In the case of a DSF data transfer, the set condition is established by gate Nos. 4 and 5, and the reset condition is established by gates 7 and 8. In the case of a DSF data transfer, the pulse width ensuring circuit 2122 ensures the ON/OFF time of a pulse, and upon termination of the need to ensure the ON/OFF time, the output of the device is made ON.

The tag transmitting circuit 433 shown in FIG. 16 includes a flip-flop circuit 4331 for $TAG_0$ output requests, a flip-flop circuit 4332 for $TAG_0$ holds, gate Nos. 1 to 4, a pulse width ensuring circuit 4333, and a driver 4334. In the operation, of the circuit 433 of FIG. 16, the flip-flop circuit 4331 for $TAG_0$ output requests is set by the received $TAG_i$. When the DSF detection operation is completed, the output request signal is delivered from gate No. 1. When the stop conditions are absent and the bus output signal allowed is received for establishing a timing, gate No. 4 is made ON, and subsequently, gate No 2 is made ON. Therefore, the flip-flop circuit 4332 for $TAG_0$ holds is set, and accordingly, the output signal is delivered from the device. With regard to the flip-flop circuit 4332 for $TAG_0$ holds, the pulse, width is ensured by the pulse width ensuring circuit 4333. When the input $TAG_i$ is made OFF, the flip-flop circuit 4332 for $TAG_0$ holds is reset by the function of gate No. 3.

As shown in FIG. 17, the frame transmitting circuit 421, includes a frame data request circuit 4211, a parallel serial conversion circuit 4212, a frame synchronization and frame formation circuit 4218, and a driver 4214, the synthesis circuit 431 includes a register 4311, and the information receiving circuit 432 includes a flip-flop circuit 4321.

The signal frame for transmission having the pattern shown in FIG. 18 is serially transmitted between the first and second distance extension devices. A specific bit in the control portion in the frame is defined as the DSF transfer information.

In the operation of the circuits shown in FIG. 17, detection of a DSF data transfer is transmitted to the flip-flop circuit 4321 in the information receiving circuit 432 and is stored therein as information. The frame transmitting circuit 421 is then operated by the CPU 44, commences to construct the frame structure of the signal, and continues to carry out the transmission operation until receiving a termination instruction from the CPU 44. The data from the data buffer is loaded to the register 4311 for constructing the frame in the synthesis circuit 431 based on the signal from the frame data request circuit, and the output of the flip-flop circuit 4321 for holding DSF transfer information is set in the bit position of the DSF transfer information in the frame. In the frame transmitting circuit 421, the frame data formed as described above is loaded in the parallel/serial circuit 4212, and the output of the parallel/serial circuit 4212 is delivered to the transmission line, while maintaining the frame synchronization of the frame data. The above-described processes are then repeated.

As shown in FIG. 19, the frame receiving circuit 422 includes a receiver 4221, a clock synchronization circuit 4222, a frame synchronization circuit 4223, and a serial/parallel circuit 4224, and the separation circuit 231 includes a register 2311.

We claim:

1. A data transfer system having a transfer discrimination circuit for discriminating a data transfer between an input/output channel device and input/output devices for a computer, said transfer discrimination circuit comprising:
   edge detection means, operating in response to a tag signal supplied to said edge detection means, for detecting a trailing edge of the tag signal after a leading edge of the tag signal has passed, said edge detection means comprising:
      a leading edge detector receiving the tag signal;
      a trailing edge detector receiving the tag signal;
      an edge detection storage element comprising a flip-flop circuit connected to said leading edge detector; and
      logic gate circuit connected to said trailing edge detector and said storage element, said logic gate circuits including an OR gate connected between said trailing edge detector and said flip flop circuit, a set input terminal of said flip-flop circuit receiving an output of said leading edge detector, and a reset input terminal of said flip-flop circuit receiving an output of said trailing edge detector through said OR gate;
   timing means, operating in response to an output of said edge detection means, for counting a predetermined time period and producing an output; and
   discrimination storage means, operating in response to the output of said timing means, for delivering an output indicating one type of data transfer or an output indicating another type of data transfer.

2. A data transfer system having a transfer discrimination circuit for discrimination a data transfer between an input/output channel device and input/output devices for a computer, said transfer discrimination circuit comprising:
   edge detection means, operating in response to a tag signal supplied to said edge detection means, for detecting a trailing edge of the tag signal after a leading edge of the tag signal has passed, said edge detection means comprising:
      a leading edge detector receiving the tag signal;
      a trailing edge detector receiving the tag signal;
      an edge detection storage element connected to said leading edge detector; and logic gate circuits connected to said trailing edge detector and said storage element;

timing means, operating in response to an output of said edge detection means, for counting a predetermined time period and producing an output; and discrimination storage means, operating in response to the output of said timing means, for delivering an output indicating one type of data transfer or an output indicating another type of data transfer and comprising a discrimination flip-flop circuit connected to said timing means and one of said logic gate circuits and said logic gate circuits including an AND gate producing an output, a set input terminal of said discrimination flip-flop circuit of said discrimination storage means receiving the output of said AND gate of said logic gate circuits, and said AND gate receiving an output of the edge detection storage element of said edge detection means and an output of said trailing edge detector of said edge detection means.

3. A data transfer discrimination circuit used for a data transfer connected in series between an input/output channel device and input/output devices for a computer, said circuit comprising:

data streaming feature data transfer detection means for detecting a data streaming feature data transfer responsive to a single tag signal and producing an output by detecting that a time between a leading edge and a trailing edge of the single tag signal transmitted from an input/output device to the input/output channel device falls within a first predetermined time period;

interlock data transfer detection means for detecting an interlock data transfer responsive to the single tag signal and producing an output by detecting that a time after the leading edge and before the trailing edge of the single tag signal transmitted from an input/output device to the input/output channel device falls within a predetermined second time period, said data transfer discrimination discriminating between the data streaming feature and interlock data transfers and said first predetermined time period being shorter than said second predetermined time period; and storage means for storing the output of said data streaming feature transfer detection means or the output of said interlock data transfer detection means.

4. A circuit as recited in claim 3, wherein said data streaming feature data transfer detection means causes production of an acknowledge signal when the trailing edge of the tag signal is detected in said first predetermined time period and said interlock data transfer means cause production a delayed acknowledge signal causing the trailing edge of the tag signal to be produced when the trailing edge of the tag signal is not detected in the first predetermined time period.

5. A circuit as recited in claim 4, wherein the tag signal, said acknowledge signal and said delayed acknowledge signal are produced autonomously.

6. A data transfer system using a channel interface distance extension device having a transfer determination means for discriminating a data transfer between an input/output channel device and input/output devices, having first and second channel interface input/output circuits, respectively, for a computer, said system comprising:

first and second distance extension means, arranged between the input/output channel device and the input/output devices, for extending a distance between the input/output channel device and the input/output devices, said first and second distance extension means comprising sequence conversion means for converting device signals, transmitted from the input/output channel device or the input/output devices through the first or the second channel interface input/output circuit in accordance with a channel interface sequence, into signals with a predetermined format and the converted signals are serially transmitted, or for converting received signals with the predetermined format into the device signals and for transmitting device signal data to the input/output channel device or the input/output devices in accordance with the channel interface sequence, said second distance extension means comprising said transfer determination means for determining whether the data transfer is an interlock data transfer or a data streaming feature data transfer by using a tag delivered first from said input/output device during a period of data transfer, and said first distance extension means comprising transfer receiving and switching means for receiving a result of the determination in said transfer determination means and switching operation of the first channel interface input/output circuit between the interlock data transfer and the data streaming feature data transfer; and a first tag response circuit for receiving a tag from the input/output devices and producing an output;

a second tag response circuit for receiving the tag from the input/output devices and a discrimination termination signal from the transfer determination means and producing an output;

a counter circuit for control of a delivery of a control output; and a selection circuit for receiving the outputs of said first and second tag response circuits and delivering either the output of said first tag response circuit or the output of said second tag response circuit as a tag to the input/output devices in accordance with the control output of said counter circuit as a selection signal, the delivery of either an output for a data streaming feature data transfer or an output for an interlock data transfer from said data transfer discrimination circuit being controlled by the control output of said counter circuit as an operation signal.

7. A system as recited in claim 6, wherein said tag has a rising edge and said transfer determination means determining said data streaming feature data transfer by a falling edge of said tag coming within a first predetermined time period shorter than a second predetermined time period for determining the interlock data transfer.

8. A system as recited in claim 7, wherein said transfer determination means produces an acknowledge signal when a trailing edge of said tag is detected in said first predetermined time period and produces a delayed acknowledge signal causing the trailing edge of said tag to be produced when the trailing edge of said tag is not detected in said first predetermined time period.

9. A system as recited in claim 8, wherein said tag, said acknowledge signal and said delayed acknowledge signal are produced autonomously.

10. A data transfer system connected in series between an input/output channel device and input/output devices for a computer, said system comprising:
- tag response means for receiving a single tag signal from the input/output devices sent to the input/output channel device and supplying the input/output devices with a response signal for responding to the received tag signal;
- data transfer discrimination means for receiving the single tag signal from the input/output devices sent to the input/output channel device, discriminating whether the data transfer is an interlock data transfer or a data streaming feature data transfer and causing said tag response means to produce the tag response signal after discrimination, said discrimination means discriminating by detecting a first predetermined time period between a rising edge and a falling edge of the single tag signal indicating the data streaming feature data transfer or a second predetermined time period indicating interlock data transfer where said first predetermined time period is shorter than said second predetermined time period; and
- control means for supplying an operation instruction signal at predetermined cycle periods to said data transfer discrimination means.

11. A data transfer system connected in series between an input/output channel device and input/output devices for a computer, said system comprising:
- tag response means for receiving a single tag signal from the input/output devices sent to the input/output channel device and supplying the input/output devices with a response signal for responding to the received single tag signal, said tag response means comprising:
  - a first tag response circuit operating at a predetermined normal timing for sending the single tag signal sent from the input/output device to the input/output channel device;
  - a second tag response circuit operating with a delay from the predetermined normal timing of the operation of said first tag response circuit; and
  - a selection circuit for selecting either an output of said first tag response circuit or an output of said second tag response circuit; and
- data transfer discrimination means for receiving the single tag signal from the input/output devices sent to the input/output channel device and discriminating whether the data transfer is an interlock data transfer or a data streaming feature data transfer by detecting a first predetermined time period between a rising edge and a falling edge of said tag signal indicating the data streaming feature data transfer or a second predetermined time period indicating the interlock data transfer where said first predetermined time period is shorter than said second predetermined time period;
- the operation of said data transfer discrimination means being terminated when the output of said first tag response circuit is selected in said selection circuit by the signal from said control means, and the operation of said data transfer discrimination means being performed when the output of said second tag response circuit is selected in said selection circuit by the signal from said control means; and
- control means for supplying an operation instruction signal at predetermined cycle periods to said data transfer discrimination means.

12. A data transfer system for a computer, with an input/output device at a distance therefrom, said system comprising:
- a communication path coupled between said computer and said input/output device; and
- transfer type discrimination means, coupled to said path, for determining a type of data transfer, responsive to a single tag signal, between the computer and the input/output device as a data streaming feature data transfer or an interlock data transfer by determining whether a first or second predetermined time periods exist where said first predetermined time period is shorter than said second predetermined time period, the first and second predetermined time periods are determined from the leading edge of the single tag signal and existence of said first predetermined time period determines that the type is a data streaming feature data transfer.

13. A system as recited in claim 12, wherein said path includes extension means for extending the distance between the computer and the input/output device.

14. A system as recited in claim 12, wherein the type includes an interlock data transfer and a data streaming transfer.

* * * * *

UNITED STATES PATENT AND TRADEMARK OFFICE
CERTIFICATE OF CORRECTION

PATENT NO. : 5,068,820

DATED : November 26, 1991

INVENTOR(S) : Nojima et al

It is certified that error appears in the above-identified patent and that said Letters Patent is hereby corrected as shown below:

Title page, Col. 2, Other Publications delete lines 4-5.

Col. 2, Other Publcations delete lines 10-11

Col. 2, Other Publciations line 12, "IBM-" should be --(IBM), --; and
line 13, ")-" should be deleted.

Item [57] Abstract, line 5, "a edge" should be --an edge --.

Col. 1, line 13, "of Related" should be --of the Related--;
line 14, "transfer" should be --transfers--;
line 46, "coincide" should be --coordinate--.

Col. 3, line 14, "an" should be --and--.

Col. 4, line 37, "gate 15" should be --gate 115--.

Col. 5, line 45, "circuit" should be --circuit,--.

Col. 6, line 29, "circuit 231, 232," should be --circuit 232,--;

UNITED STATES PATENT AND TRADEMARK OFFICE
CERTIFICATE OF CORRECTION

PATENT NO. : 5,068,820

DATED : November 26, 1991

INVENTOR(S) : Nojima et al.

It is certified that error appears in the above-identified patent and that said Letters Patent is hereby corrected as shown below:

Col. 7, line 53, "control" should be --control,--.

Col. 8, line 60, "examples," should be --examples--.

Col. 9, line 48, "pulse," to --pulse--.

Col. 10, line 39, "circuit" should be --circuits--;
        line 56, "discrimination" should be --discriminating--.

Signed and Sealed this

Thirteenth Day of July, 1993

Attest:

MICHAEL K. KIRK

Attesting Officer     Acting Commissioner of Patents and Trademarks